(12) United States Patent
Putnam et al.

(10) Patent No.: US 8,712,816 B2
(45) Date of Patent: *Apr. 29, 2014

(54) COMPUTERIZED APPARATUS FOR IDENTIFYING INDUSTRIES FOR POTENTIAL TRANSFER OF A JOB FUNCTION

(75) Inventors: Laura T. Putnam, Sherman, CT (US); Eileen C. Shapiro, Cambridge, MA (US); Steven J. Mintz, Saddle River, NJ (US)

(73) Assignee: RightOptions LLC, Cambridge, MA (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/269,073

(22) Filed: Oct. 7, 2011

(65) Prior Publication Data

US 2012/0030127 A1    Feb. 2, 2012

Related U.S. Application Data

(63) Continuation of application No. 09/882,292, filed on Jun. 15, 2001, now Pat. No. 8,036,924.

(60) Provisional application No. 60/211,823, filed on Jun. 15, 2000, provisional application No. 60/242,043, filed on Oct. 20, 2000.

(51) Int. Cl.
*G06Q 10/00*    (2012.01)

(52) U.S. Cl.
USPC ........... 705/7.12; 705/320; 705/321; 705/328

(58) Field of Classification Search
USPC .............................................. 705/7.12, 7.38
See application file for complete search history.

(56) References Cited

U.S. PATENT DOCUMENTS

| | | | |
|---|---|---|---|
| 5,592,375 A * | 1/1997 | Salmon et al. ................ | 705/321 |
| 5,832,497 A * | 11/1998 | Taylor ................................... | 1/1 |
| 5,884,270 A | 3/1999 | Walker et al. ..................... | 705/1 |
| 5,884,272 A | 3/1999 | Walker et al. ..................... | 705/1 |
| 5,978,767 A * | 11/1999 | Chriest et al. ................. | 705/328 |
| 6,041,311 A | 3/2000 | Chislenko et al. .............. | 705/27 |
| 6,064,980 A | 5/2000 | Jacobi et al. .................... | 705/26 |
| 6,266,659 B1 * | 7/2001 | Nadkarni ..................... | 705/7.14 |
| 6,385,620 B1 * | 5/2002 | Kurzius et al. ......................... | 1/1 |
| 6,662,194 B1 * | 12/2003 | Joao ............................... | 705/1.1 |
| 2001/0039508 A1 * | 11/2001 | Nagler et al. ................... | 705/11 |
| 2001/0049674 A1 * | 12/2001 | Talib et al. ....................... | 707/1 |

OTHER PUBLICATIONS

Reich, Blaize Horner; Kaarst-Brown, Michelle Lynn, "Seeding the Line": Understanding the Transition From IT to Non-IT Careers (1), MIS Quarterly, 23,3,337, Sep. 1999. Dialog File 148.*

Salopek, Jennifer J., Outsourcing, insourcing, and in-between sourcing, Training & Development, v52, n7, p. 51 (6), Jul. 1998. Dialog File 148.* www.careerelite.com website information sheet, Jun. 5, 2000.

* cited by examiner

*Primary Examiner* — Andre Boyce

(74) *Attorney, Agent, or Firm* — Sunstein Kann Murphy & Timbers LLP

(57) ABSTRACT

Methods for identifying industries for potential transfer of a job function capability involve the use of a database that correlates, for a job function in a first industry, the first industry with a set of second industries with respect to which a job function capability of the job function is potentially transferable. The database can be accessed to identify the second set of industries. A symbolic representation of a job transfer between the first industry and a second industry or a symbolic representation that categorizes a subject of a user's job transferability query may be used to access the database.

16 Claims, 52 Drawing Sheets

| FIG. 11A-1 | FIG. 11A-4 | FIG. 11A-7 |
|---|---|---|
| FIG. 11A-2 | FIG. 11A-5 | FIG. 11A-8 |
| FIG. 11A-3 | FIG. 11A-6 | FIG. 11A-9 |

FIG. 11A

| FIG. 11B-1 | FIG. 11B-4 | FIG. 11B-7 |
|---|---|---|
| FIG. 11B-2 | FIG. 11B-5 | FIG. 11B-8 |
| FIG. 11B-3 | FIG. 11B-6 | FIG. 11B-9 |

FIG. 11B

| FIG. 2B-1 | FIG. 2B-4 | FIG. 2B-7 |
|---|---|---|
| FIG. 2B-2 | FIG. 2B-5 | FIG. 2B-8 |
| FIG. 2B-3 | FIG. 2B-6 | FIG. 2B-9 |

FIG. 2B

| FIG. 2C-1 | FIG. 2C-2 | FIG. 2C-3 |
|---|---|---|

FIG. 2C

| FIG. 1-1 | FIG. 1-3 | FIG. 1-5 |
|---|---|---|
| FIG. 1-2 | FIG. 1-4 | FIG. 1-6 |

FIG. 1

| FIG. 2A-1 | FIG. 2A-4 | FIG. 2A-7 |
|---|---|---|
| FIG. 2A-2 | FIG. 2A-5 | FIG. 2A-8 |
| FIG. 2A-3 | FIG. 2A-6 | FIG. 2A-9 |

FIG. 2A

The chart below illustrates the transfer potential between various industries for the Marketing Management function. An "x" at the intersection of a row and column indicates the potential for transfer between the industry listed in the row heading and the industry listed in the column heading. *Instructions for the Job Seeker:* Identify the row heading on the vertical axis corresponding to your industry then read across that row for indication of transfer potential into the industries listed in the column headings on the horizontal axis.

| Industry: | Consumer Package Goods: Including Food, Beverage, HBA & Household Cleaning Products | Consumer Durables: Including Apparel, Accessories, Furniture & Related Products | Entertainment Products: Including Non-Engine Driven, Games, Toys & Other Recreation Products | Computer Products: Including Personal Computers, Handhelds & Peripheral Products | Consumer Software: Including Personal Finance & Word Processing Software | Consumer Appliances: Including Large Household Appliances | Consumer Electronics: Including TV, Radio, VCR & Telephone Equipment Products |
|---|---|---|---|---|---|---|---|
| Consumer Package Goods | x | | | | | | |
| Consumer Durables | | x | x | x | x | x | x |
| Entertainment Products | x | x | x | x | x | x | x |
| Computer Products | | x | x | x | x | x | x |

FIG. 1-1

|  | | | | | | |
|---|---|---|---|---|---|---|
| Consumer Software | | | x | | | x |
| Consumer Appliances | x | | | x | x | x |
| Consumer Electronics | x | | x | x | x | x |
| Pharma-ceuticals | | | | | | |
| Fast Food & Quick Serve Restaurants | | | x | x | | |
| Hospitality | | | | | | |
| Consumer Financial Services | | | | | | |
| Wireless Telecom-munications | | | | | | |
| Long Distance Telecom-munications | | | | | | |
| Travel & Transporta-tion | | | | | | |
| Media & Publishing | | | | | | |
| Retail | | | | | | |
| B2B Services | | | | | | |

FIG. 1-2

*Instructions for Employers:* Identify the column heading on the horizontal axis corresponding to your industry then read down that column for indication of transfer potential from the industries listed in the row headings on the vertical axis. (Rating Scale: "x" indicates transfer potential; a blank indicates little to no transfer potential.)

| Pharmaceuticals: Including Prescription Medication Products | Fast Food & Quick Serve Restaurants: Including Fast Food Restaurant Chains & Related Establishments | Hospitality: Including Hotels, Motels, Resorts & Gaming Establishments | Consumer Financial Services: Including Retail Banks, Brokerage & Credit Card Services | Wireless Telecommunications (Consumer): Including Cellular & PCS Wireless Communications Services | Long Distance Telecommunications (Consumer): Including Landline Long Distance Telecommunications Services | Travel & Transportation: Including Air, Rail & Ground Passenger Transportation Services |
|---|---|---|---|---|---|---|
| x | x | x | x | x | x | x |
|   | x |   |   |   |   |   |
|   | x | x |   | x | x | x |
|   |   |   |   |   |   |   |

| Media & Publishing: Including Magazines, Newspapers & Periodicals | Retail: Including Department, Mass Merchant & Specialty Stores | Business to Business Services: Including Accounting, Payroll & Third Party Data Processing Services |
|---|---|---|
|  |  | x |
| x | x |  |
| x |  |  |
| x | x |  |

Job Seeker _____

_Instructions To The Job Seeker:_ Identify the row on the vertical axis corresponding to your industry then read across that row for ratings of transferability into the industries listed in the column headings on the horizontal axis.

| Industry: | Consumer Package Goods: Including Food, Beverage, HBA & Household Cleaning Products (M1) | Consumer Durables: Including Apparel, Accessories, Furniture & Related Products (M2) | Entertain-ment Products: Including Non-Engine Driven, Games, Toys & Other Recreation Products (M3) | Computer Products: Including Personal Computers, Handhelds & Peripheral Products (M4) | Consumer Software: Including Personal Finance & Word Processing Software (M5) | Consumer Appliances: Including Large Household Appliances (M6) | Consumer Electronics: Including TV, Radio, VCR & Telephone Equipment Products (M7) |
|---|---|---|---|---|---|---|---|
| Consumer Package Goods (M1) | 3 | 3 | 3 | 2 | 2 | 2 | 2 |
| Consumer Durables (M2) | 1 | 3 | 3 | 2 | 2 | 2 | 2 |
| Entertain-ment Products (M3) | 2 | 3 | 3 | 3 | 3 | 2 | 3 |

FIG. 2A-1

| | | | | | | |
|---|---|---|---|---|---|---|
| Computer Products (M4) | 0 | 2 | 2 | 3 | 3 | 2 | 3 |
| Consumer Software (M5) | 0 | 0 | 2 | 3 | 3 | 0 | 2 |
| Consumer Appliances (M6) | 0 | 2 | 1 | 2 | 1 | 3 | 3 |
| Consumer Electronics (M7) | 0 | 2 | 3 | 3 | 3 | 3 | 3 |
| Pharmaceuticals (M8) | 0 | 0 | 0 | 0 | 0 | 0 | 0 |
| Fast Food & Quick Serve Restaurants (M9) | 0 | 0 | 1 | 1 | 1 | 0 | 0 |
| Hospitality (M10) | 0 | 0 | 0 | 0 | 0 | 0 | 0 |
| Consumer Financial Services (M11) | 0 | 0 | 0 | 0 | 0 | 0 | 0 |

FIG. 2A-2

| | | | | | | | |
|---|---|---|---|---|---|---|---|
| Wireless Communi- cations (M12) | 0 | 0 | 0 | 0 | 0 | 0 | 0 |
| Long Distance Communi- cations (M13) | 0 | 0 | 0 | 0 | 0 | 0 | 0 |
| Travel & Transporta- tion (M14) | 0 | 0 | 0 | 0 | 0 | 0 | 0 |
| Media & Publishing (M15) | 0 | 0 | 0 | 0 | 0 | 0 | 0 |
| Retail (M16) | 0 | 1 | 0 | 0 | 0 | 0 | 0 |
| B2B Services (M17) | 0 | 0 | 0 | 0 | 0 | 0 | 0 |

FIG. 2A-3

(Rating Scale: "3" indicates greatest transfer potential; "0" indicates no transfer potential.) Clicking on a given transfer rating will produce an explanation of that rating.

| Pharmaceuticals: Including Prescription Medication Products (M8) | Fast Food & Quick Serve Restaurants: Including Fast Food Restaurant Chains & Related Establishments (M9) | Hospitality: Including Hotels, Motels, Resorts & Gaming Establishments (M10) | Consumer Financial Services: Including Retail Banks, Brokerage & Credit Card Services (M11) | Wireless Communications (Consumer): Including Cellular & PCS Wireless Communications Services (M12) | Long Distance Communications (Consumer): Including Land-Line Long Distance Communications Services (M13) | Travel & Transportation: Including Air, Rail & Ground Passenger Transportation Services (M14) |
|---|---|---|---|---|---|---|
| 3 | 3 | 2 | 2 | 3 | 3 | 3 |
| 1 | 2 | 1 | 1 | 1 | 2 | 1 |
| 1 | 3 | 3 | 1 | 2 | 2 | 2 |

FIG. 2A-4

| 1 | 0 | 0 | 0 | 0 | 3 | 3 | 3 |
|---|---|---|---|---|---|---|---|
| 1 | 0 | 0 | 0 | 0 | 3 | 2 | 3 |
| 2 | 1 | 1 | 1 | 0 | 3 | 2 | 3 |
| 1 | 1 | 0 | 0 | 0 | 3 | 3 | 3 |
| 1 | 0 | 0 | 0 | 0 | 3 | 3 | 2 |
| 1 | 0 | 0 | 1 | 0 | 3 | 3 | 1 |
| 1 | 0 | 0 | 0 | 3 | 0 | 0 | 0 |

FIG. 2A-5

| 3 | 1 | 3 | 1 | 1 | 0 |
|---|---|---|---|---|---|
| 3 | 3 | 1 | 1 | 1 | 0 |
| 3 | 3 | 1 | 0 | 1 | 0 |
| 3 | 1 | 1 | 1 | 1 | 0 |
| 1 | 1 | 2 | 1 | 1 | 0 |
| 1 | 0 | 1 | 0 | 1 | 0 |
| 0 | 0 | 0 | 0 | 0 | 0 |

FIG. 2A-6

| Media & Publishing: Including Magazines, Newspapers & Periodicals (M15) | Retail: Including Department, Mass Merchant & Specialty Stores (M16) | Business to Business Services: Including Accounting, Payroll & Third Party Data Processing Services (M17) |
|---|---|---|
| 3 | 2 | 2 |
| 1 | 2 | 1 |
| 2 | 1 | 1 |

FIG. 2A-7

| 1 | 1 | 0 | 0 | 0 | 0 | 1 | 3 |
|---|---|---|---|---|---|---|---|
| 1 | 0 | 0 | 1 | 0 | 3 | 3 | 2 |
| 1 | 0 | 0 | 0 | 0 | 2 | 2 | 2 |

FIG. 2A-8

| 2 | 0 | 1 |
|---|---|---|
| 1 | 0 | 1 |
| 0 | 0 | 0 |
| 3 | 0 | 0 |
| 1 | 3 | 0 |
| 0 | 0 | 3 |

FIG. 2A-9

Employer/Recruiter

*Instructions To Employers:* Identify the column heading on the horizontal axis corresponding to your industry then read down that column for ratings of transferability from industries listed in the row headings on the vertical axis.

| Industry: | Consumer Package Goods: Including Food, Beverage, HBA & Household Cleaning Products (M1) | Consumer Durables: Including Apparel, Accessories, Furniture & Related Products (M2) | Entertainment Products: Including Non-Engine Driven, Games, Toys & Other Recreation Products (M3) | Computer Products: Including Personal Computers, Handhelds & Peripheral Products (M4) | Consumer Software: Including Personal Finance & Word Processing Software (M5) | Consumer Appliances: Including Large Household Appliances (M6) | Consumer Electronics: Including TV, Radio, VCR & Telephone Equipment Products (M7) |
|---|---|---|---|---|---|---|---|
| Consumer Package Goods (M1) | 3 | 3 | 3 | 2 | 2 | 2 | 2 |
| Consumer Durables (M2) | 1 | 3 | 3 | 2 | 2 | 2 | 2 |
| Entertainment Products (M3) | 2 | 3 | 3 | 3 | 3 | 2 | 3 |

FIG. 2B-1

| | | | | | | | |
|---|---|---|---|---|---|---|---|
| Computer Products (M4) | 0 | 2 | 2 | 3 | 3 | 2 | 3 |
| Consumer Software (M5) | 0 | 0 | 2 | 3 | 3 | 0 | 2 |
| Consumer Appliances (M6) | 0 | 2 | 1 | 2 | 1 | 3 | 3 |
| Consumer Electronics (M7) | 0 | 2 | 3 | 3 | 3 | 3 | 3 |
| Pharma- ceuticals (M8) | 0 | 0 | 0 | 0 | 0 | 0 | 0 |
| Fast Food & Quick Serve Restaurants (M9) | 0 | 0 | 1 | 1 | 1 | 0 | 0 |
| Hospitality (M10) | 0 | 0 | 0 | 0 | 0 | 0 | 0 |
| Consumer Financial Services (M11) | 0 | 0 | 0 | 0 | 0 | 0 | 0 |

FIG. 2B-2

| | | | | | | | |
|---|---|---|---|---|---|---|---|
| Wireless Communi- cations (M12) | 0 | 0 | 0 | 0 | 0 | 0 | 0 |
| Long Distance Communi- cations (M13) | 0 | 0 | 0 | 0 | 0 | 0 | 0 |
| Travel & Transporta- tion (M14) | 0 | 0 | 0 | 0 | 0 | 0 | 0 |
| Media & Publishing (M15) | 0 | 0 | 0 | 0 | 0 | 0 | 0 |
| Retail (M16) | 0 | 1 | 0 | 0 | 0 | 0 | 0 |
| B2B Services (M17) | 0 | 0 | 0 | 0 | 0 | 0 | 0 |

FIG. 2B-3

(Rating Scale: "3" indicates greatest transfer potential; "0" indicates no transfer potential.) Clicking on a given transfer rating will produce an explanation of that rating.

| Pharmaceuticals: Including Prescription Medication Products (M8) | Fast Food & Quick Serve Restaurants: Including Fast Food Restaurant Chains & Related Establishments (M9) | Hospitality: Including Hotels, Motels, Resorts & Gaming Establishments (M10) | Consumer Financial Services: Including Retail Banks, Brokerage & Credit Card Services (M11) | Wireless Communications (Consumer): Including Cellular & PCS Wireless Communications Services (M12) | Long Distance Communications (Consumer): Including Land-Line Long Distance Communications Services (M13) | Travel & Transportation: Including Air, Rail & Ground Passenger Transportation Services (M14) |
|---|---|---|---|---|---|---|
| 3 | 3 | 2 | 2 | 3 | 3 | 3 |
| 1 | 2 | 1 | 1 | 1 | 2 | 1 |
| 1 | 3 | 3 | 1 | 2 | 2 | 2 |

FIG. 2B-4

| 1 | 0 | 0 | 0 | 0 | 3 | 3 | 3 |
|---|---|---|---|---|---|---|---|
| 1 | 0 | 0 | 0 | 0 | 3 | 2 | 3 |
| 2 | 1 | 1 | 1 | 0 | 3 | 2 | 3 |
| 1 | 1 | 0 | 0 | 0 | 3 | 3 | 3 |
| 1 | 0 | 0 | 0 | 0 | 3 | 3 | 2 |
| 1 | 0 | 0 | 1 | 0 | 3 | 3 | 1 |
| 1 | 0 | 0 | 0 | 3 | 0 | 0 | 0 |

FIG. 2B-5

| 3 | 1 | 3 | 1 | 1 | 0 |
|---|---|---|---|---|---|
| 3 | 3 | 1 | 1 | 1 | 0 |
| 3 | 3 | 1 | 0 | 1 | 0 |
| 3 | 1 | 1 | 1 | 1 | 0 |
| 1 | 1 | 2 | 1 | 1 | 0 |
| 1 | 0 | 1 | 0 | 1 | 0 |
| 0 | 0 | 0 | 0 | 0 | 0 |

FIG. 2B-6

| Media & Publishing: Including Magazines, Newspapers & Periodicals (M15) | Retail: Including Department, Mass Merchant & Specialty Stores (M16) | Business to Business Services: Including Accounting, Payroll & Third Party Data Processing Services (M17) |
|---|---|---|
| 3 | 2 | 2 |
| 1 | 2 | 1 |
| 2 | 1 | 1 |

FIG. 2B-7

| 1 | 1 | 0 | 0 | 0 | 0 | 1 | 3 |
|---|---|---|---|---|---|---|---|
| 1 | 0 | 0 | 1 | 0 | 3 | 3 | 2 |
| 1 | 0 | 0 | 0 | 0 | 2 | 2 | 2 |

FIG. 2B-8

| 1 | 1 | 0 | 0 | 0 | 3 |
|---|---|---|---|---|---|
| 0 | 0 | 0 | 0 | 3 | 0 |
| 2 | 1 | 0 | 3 | 1 | 0 |

FIG. 2B-9

Industry Transferability Ratings

*Instructions To The Job Seeker:* The chart below illustrates transferability ratings for the Consumer Package Goods Marketing Management function across various industries. Read across the row for ratings of transferability for this function and industry experience combination

| Industry: | Consumer Package Goods: Including Food, Beverage, HBA & Household Cleaning Products (M1) | Consumer Durables: Including Apparel, Accessories, Furniture & Related Products (M2) | Entertainment Products: Including Non-Engine Driven, Games, Toys & Other Recreation Products (M3) | Computer Products: Including Personal Computers, Handhelds & Peripheral Products (M4) | Consumer Software: Including Personal Finance & Word Processing Software (M5) | Consumer Appliances: Including Large Household Appliances (M6) | Consumer Electronics: Including TV, Radio, VCR & Telephone Equipment Products (M7) |
|---|---|---|---|---|---|---|---|
| Consumer Package Goods (M1) | 3 | 3 | 3 | 2 | 2 | 2 | 2 |

FIG. 2C-1 into the industries listed in the column headings on the horizontal axis. (Rating Scale: "3" indicates greatest transfer potential; "0" indicates no transfer potential.) Clicking on a given transfer rating will produce a rating explanation.

| Pharma-ceuticals: Including Prescription Medication Products (M8) | Fast Food & Quick Serve Restaurants: Including Fast Food Restaurant Chains & Related Establishments (M9) | Hospitality: Including Hotels, Motels, Resorts & Gaming Establishments (M10) | Consumer Financial Services: Including Retail Banks, Brokerage & Credit Card Services (M11) | Wireless Communications (Consumer): Including Cellular & PCS Wireless Communications Services (M12) | Long Distance Communications (Consumer): Including Land-Line Long Distance Communications Services (M13) | Travel & Transporta-tion: Including Air, Rail & Ground Passenger Transporta-tion Services (M14) |
|---|---|---|---|---|---|---|
| 3 | 3 | 2 | 2 | 3 | 3 | 3 |

FIG. 2C-2

| Media & Publishing: Including Magazines, Newspapers & Periodicals (M15) | Retail: Including Department, Mass Merchant & Specialty Stores (M16) | Business to Business Services: Including Accounting, Payroll & Third Party Data Processing Services (M17) |
|---|---|---|
| 3 | 2 | 2 |

FIG. 2C-3

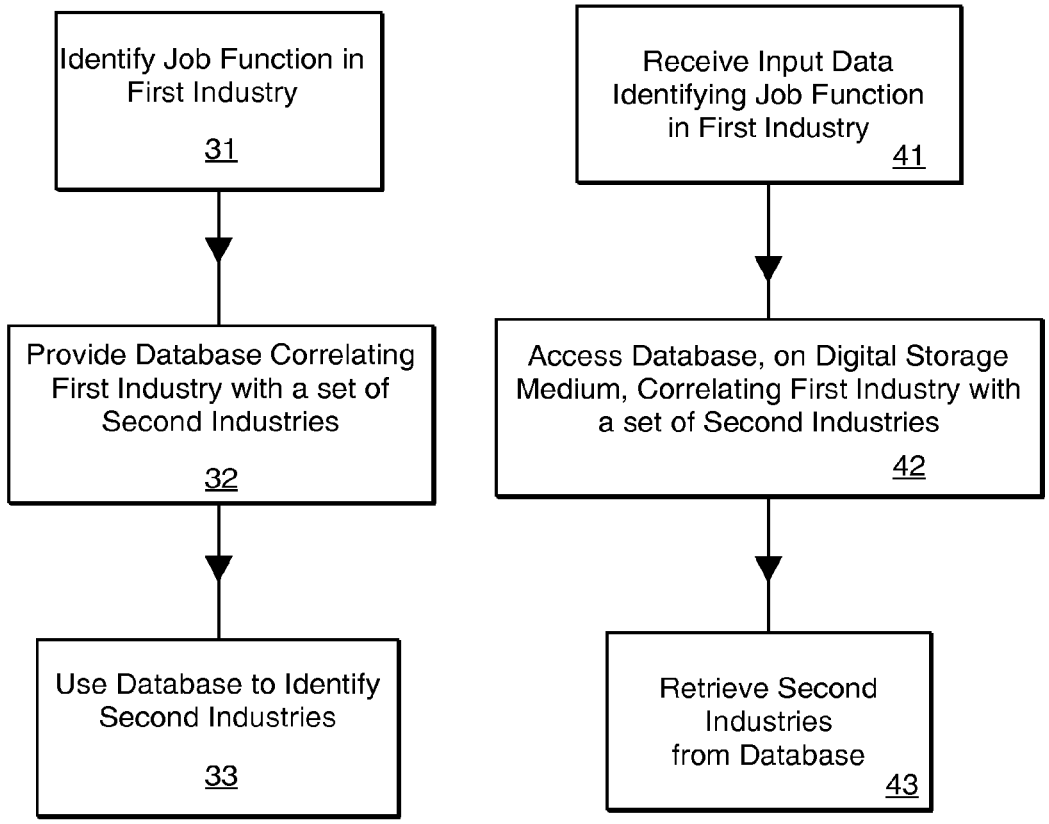
FIG. 3
FIG. 4
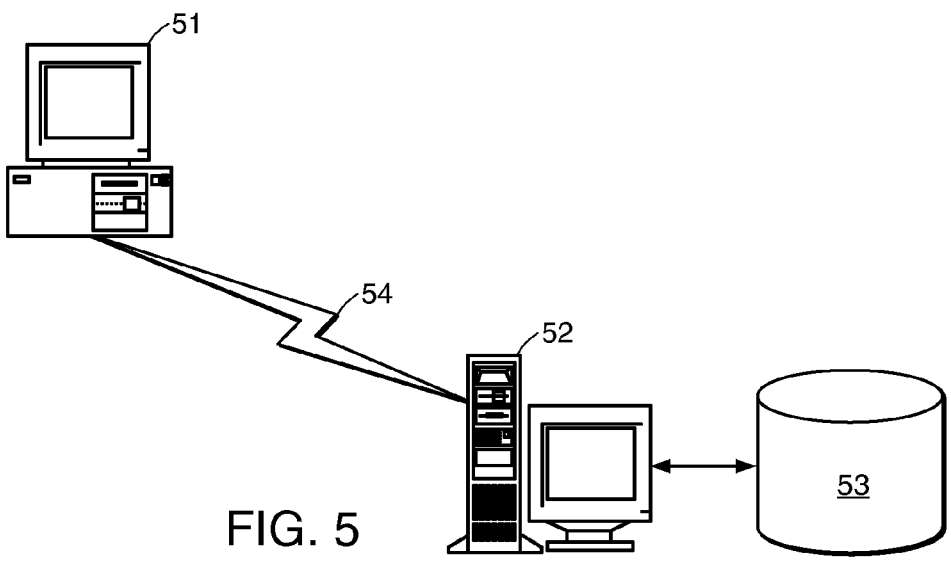
FIG. 5

Industry Transferability Matrix and Ratings

Symbolic structure of a transferability matrix database for the (Consumer) Marketing Management function.

| Industry: | Consumer Package Goods: Including Food, Beverage, HBA & Household Cleaning Products (M1) | Consumer Durables: Including Apparel, Accessories, Furniture & Related Products (M2) | Entertainment Products: Including Non-Engine Driven, Games, Toys & Other Recreation Products (M3) | Computer Products: Including Personal Computers, Handhelds & Peripheral Products (M4) | Consumer Software: Including Personal Finance & Word Processing Software (M5) | Consumer Appliances: Including Large Household Appliances (M6) | Consumer Electronics: Including TV, Radio, VCR & Telephone Equipment Products (M7) |
|---|---|---|---|---|---|---|---|
| Consumer Package Goods (M1) | M1+M1=3 | M1+M2=3 | M1+M3=3 | M1+M4=2 | M1+M5=2 | M1+M6=2 | M1+M7=2 |
| Consumer Durables (M2) | M2+M1=1 | M2+M2=3 | M2+M3=3 | M2+M4=2 | M2+M5=2 | M2+M6=2 | M2+M7=2 |
| Entertainment Products (M3) | M3+M1=2 | M3+M2=3 | M3+M3=3 | M3+M4=3 | M3+M5=3 | M3+M6=2 | M3+M7=3 |

FIG. 11A-1

| | | | | | | |
|---|---|---|---|---|---|---|
| Computer Products (M4) | M4+M1=0 | M4+M2=2 | M4+M3=2 | M4+M4=3 | M4+M5=3 | M4+M6=2 | M4+M7=3 |
| Consumer Software (M5) | M5+M1=0 | M5+M2=0 | M5+M3=2 | M5+M4=3 | M5+M5=3 | M5+M6=0 | M5+M7=2 |
| Consumer Appliances (M6) | M6+M1=0 | M6+M2=1 | M6+M3=1 | M6+M4=2 | M6+M5=1 | M6+M6=3 | M6+M7=3 |
| Consumer Electronics (M7) | M7+M1=0 | M7+M2=2 | M7+M3=3 | M7+M4=3 | M7+M5=3 | M7+M6=3 | M7+M7=3 |
| Pharma-ceuticals (M8) | M8+M1=0 | M8+M2=0 | M8+M3=0 | M8+M4=0 | M8+M5=0 | M8+M6=0 | M8+M7=0 |
| Fast Food & Quick Serve Restaurants (M9) | M9+M1=0 | M9+M2=0 | M9+M3=1 | M9+M4=1 | M9+M5=1 | M9+M6=0 | M9+M7=0 |
| Hospitality (M10) | M10+M1=0 | M10+M2=0 | M10+M3=0 | M10+M4=0 | M10+M5=0 | M10+M6=0 | M10+M7=0 |
| Consumer Financial Services (M11) | M11+M1=0 | M11+M2=0 | M11+M3=0 | M11+M4=0 | M11+M5=0 | M11+M6=0 | M11+M7=0 |

FIG. 11A-2

| | | | | | | |
|---|---|---|---|---|---|---|
| Wireless Communi- cations (M12) | M12+M1=0 | M12+M2=0 | M12+M3=0 | M12+M4=0 | M12+M5=0 | M12+M6=0 | M12+M7=0 |
| Long Distance Communi- cations (M13) | M13+M1=0 | M13+M2=0 | M13+M3=0 | M13+M4=0 | M13+M5=0 | M13+M6=0 | M13+M7=0 |
| Travel & Transporta- tion (M14) | M14+M1=0 | M14+M2=0 | M14+M3=0 | M14+M4=0 | M14+M5=0 | M14+M6=0 | M14+M7=0 |
| Media & Publishing (M15) | M15+M1=0 | M15+M2=0 | M15+M3=0 | M15+M4=0 | M15+M5=0 | M15+M6=0 | M15+M7=0 |
| Retail (M16) | M16+M1=0 | M16+M2=1 | M16+M3=0 | M16+M4=0 | M16+M5=0 | M16+M6=0 | M16+M7=0 |
| B2B Services (M17) | M17+M1=0 | M17+M2=0 | M17+M3=0 | M17+M4=0 | M17+M5=0 | M17+M6=0 | M17+M7=0 |

FIG. 11A-3

(Rating Scale: "3" indicates greatest transfer potential; "0" indicates no transfer potential.) Clicking on a given transfer rating will produce an explanation of that rating.

| Pharmaceuticals: Including Prescription Medication Products (M8) | Fast Food & Quick Serve Restaurants: Including Fast Food Restaurant Chains & Related Establishments (M9) | Hospitality: Including Hotels, Motels, Resorts & Gaming Establishments (M10) | Consumer Financial Services: Including Retail Banks, Brokerage & Credit Card Services (M11) | Wireless Communications (Consumer): Including Cellular & PCS Wireless Communications Services (M12) | Long Distance Communications (Consumer): Including Land-Line Long Distance Communications Services (M13) | Travel & Transportation: Including Air, Rail & Ground Passenger Transportation Services (M14) |
|---|---|---|---|---|---|---|
| M1+M8=3 | M1+M9=3 | M1+M10=2 | M1+M11=2 | M1+M12=3 | M1+M13=3 | M1+M14=3 |
| M2+M8=1 | M2+M9=2 | M2+M10=1 | M2+M11=1 | M2+M12=1 | M2+M13=2 | M2+M14=1 |
| M3+M8=1 | M3+M9=3 | M3+M10=3 | M3+M11=1 | M3+M12=2 | M3+M13=2 | M3+M14=2 |

FIG. 11A-4

| M4+M8=1 | M4+M9=1 | M4+M10=1 | M4+M11=1 | M4+M12=2 | M4+M13=1 | M4+M14=1 |
|---|---|---|---|---|---|---|
| M5+M8=0 | M5+M9=0 | M5+M10=0 | M5+M11=1 | M5+M12=1 | M5+M13=0 | M5+M14=0 |
| M6+M8=0 | M6+M9=0 | M6+M10=0 | M6+M11=0 | M6+M12=1 | M6+M13=0 | M6+M14=0 |
| M7+M8=0 | M7+M9=1 | M7+M10=0 | M7+M11=0 | M7+M12=1 | M7+M13=0 | M7+M14=0 |
| M8+M8=3 | M8+M9=0 | M8+M10=0 | M8+M11=0 | M8+M12=0 | M8+M13=0 | M8+M14=0 |
| M9+M8=0 | M9+M9=3 | M9+M10=3 | M9+M11=3 | M9+M12=3 | M9+M13=3 | M9+M14=3 |
| M10+M8=0 | M10+M9=3 | M10+M10=3 | M10+M11=3 | M10+M12=2 | M10+M13=2 | M10+M14=3 |
| M11+M8=0 | M11+M9=1 | M11+M10=2 | M11+M11=3 | M11+M12=3 | M11+M13=3 | M11+M14=3 |

FIG. 11A-5

| M12+M8=0 | M12+M9=1 | M12+M10=1 | M12+M11=3 | M12+M12=3 | M12+M13=3 | M12+M14=3 |
| --- | --- | --- | --- | --- | --- | --- |
| M13+M8=0 | M13+M9=0 | M13+M10=1 | M13+M11=1 | M13+M12=3 | M13+M13=3 | M13+M14=1 |
| M14+M8=0 | M14+M9=1 | M14+M10=2 | M14+M11=1 | M14+M12=1 | M14+M13=1 | M14+M14=3 |
| M15+M8=0 | M15+M9=0 | M15+M10=1 | M15+M11=1 | M15+M12=0 | M15+M13=1 | M15+M14=1 |
| M16+M8=0 | M16+M9=1 | M16+M10=1 | M16+M11=1 | M16+M12=1 | M16+M13=1 | M16+M14=1 |
| M17+M8=0 | M17+M9=0 | M17+M10=0 | M17+M11=0 | M17+M12=0 | M17+M13=0 | M17+M14=0 |

FIG. 11A-6

| | Media & Publishing: Including Magazines, Newspapers & Periodicals (M15) | Retail: Including Department, Mass Merchant & Specialty Stores (M16) | Business to Business Services: Including Accounting, Payroll & Third Party Data Processing Services (M17) |
|---|---|---|---|
| | M1+M15=3 | M1+M16=2 | M1+M17=2 |
| | M2+M15=1 | M2+M16=2 | M2+M17=1 |
| | M3+M15=2 | M3+M16=1 | M3+M17=1 |

FIG. 11A-7

| M4+M15=1 | M4+M16=1 | M4+M17=1 |
|---|---|---|
| M5+M15=1 | M5+M16=0 | M5+M17=0 |
| M6+M15=0 | M6+M16=0 | M6+M17=0 |
| M7+M15=0 | M7+M16=1 | M7+M17=0 |
| M8+M15=0 | M8+M16=0 | M8+M17=0 |
| M9+M15=0 | M9+M16=3 | M9+M17=2 |
| M10+M15=1 | M10+M16=3 | M10+M17=2 |
| M11+M15=3 | M11+M16=2 | M11+M17=2 |

FIG. 11A-8

| M12+M15=2 | M12+M16=0 | M12+M17=1 |
| --- | --- | --- |
| M13+M15=1 | M13+M16=0 | M13+M17=1 |
| M14+M15=0 | M14+M16=0 | M14+M17=0 |
| M15+M15=3 | M15+M16=0 | M15+M17=0 |
| M16+M15=1 | M16+M16=3 | M16+M17=0 |
| M17+M15=0 | M17+M16=0 | M17+M17=3 |

FIG. 11A-9

Industry Transferability Matrix and Ratings

Symbolic structure of a transferability matrix database for the Operations Management function.

| Industry: | Consumer Package Goods: Including Food, Beverage, HBA & Household Cleaning Products (O1) | Consumer Durables: Including Apparel, Accessories, Furniture & Related Products (O2) | Entertainment Products: Including Non-Engine Driven, Games, Toys & Other Recreation Products (O3) | Computer Products: Including Personal Computers, Handhelds & Peripheral Products (O4) | Consumer Software: Including Personal Finance & Word Processing Software (O5) | Consumer Appliances: Including Large Household Appliances (O6) | Consumer Electronics: Including TV, Radio, VCR & Telephone Equipment Products (O7) |
|---|---|---|---|---|---|---|---|
| Consumer Package Goods (O1) | O1+O1=3 | O1+O2=0 | O1+O3=0 | O1+O4=0 | O1+O5=0 | O1+O6=0 | O1+O7=0 |
| Consumer Durables (O2) | O2+O1=0 | O2+O2=3 | O2+O3=2 | O2+O4=0 | O2+O5=0 | O2+O6=0 | O2+O7=0 |
| Entertainment Products (O3) | O3+O1=0 | O3+O2=3 | O3+O3=3 | O3+O4=1 | O3+O5=2 | O3+O6=0 | O3+O7=1 |

FIG. 11B-1

|  | O1 | O2 | O3 | O4 | O5 | O6 | O7 |
|---|---|---|---|---|---|---|---|
| Computer Products (O4) | O4+O1=0 | O4+O2=2 | O4+O3=2 | O4+O4=3 | O4+O5=3 | O4+O6=2 | O4+O7=3 |
| Consumer Software (O5) | O5+O1=0 | O5+O2=0 | O5+O3=1 | O5+O4=1 | O5+O5=3 | O5+O6=0 | O5+O7=1 |
| Consumer Appliances (O6) | O6+O1=0 | O6+O2=1 | O6+O3=1 | O6+O4=1 | O6+O5=1 | O6+O6=3 | O6+O7=3 |
| Consumer Electronics (O7) | O7+O1=0 | O7+O2=2 | O7+O3=3 | O7+O4=3 | O7+O5=3 | O7+O6=3 | O7+O7=3 |
| Pharmaceuticals (O8) | O8+O1=2 | O8+O2=0 | O8+O3=0 | O8+O4=0 | O8+O5=0 | O8+O6=0 | O8+O7=0 |
| Fast Food & Quick Serve Restaurants (O9) | O9+O1=0 | O9+O2=0 | O9+O3=0 | O9+O4=0 | O9+O5=0 | O9+O6=0 | O9+O7=0 |
| Hospitality (O10) | O10+O1=0 | O10+O2=0 | O10+O3=0 | O10+O4=0 | O10+O5=0 | O10+O6=0 | O10+O7=0 |
| Consumer Financial Services (O11) | O11+O1=0 | O11+O2=0 | O11+O3=0 | O11+O4=0 | O11+O5=0 | O11+O6=0 | O11+O7=0 |

FIG. 11B-2

| | | | | | | |
|---|---|---|---|---|---|---|
| Wireless Communi- cations (O12) | O12+O1=0 | O12+O2=0 | O12+O3=0 | O12+O4=0 | O12+O5=0 | O12+O6=0 | O12+O7=0 |
| Long Distance Communi- cations (O13) | O13+O1=0 | O13+O2=0 | O13+O3=0 | O13+O4=0 | O13+O5=0 | O13+O6=0 | O13+O7=0 |
| Travel & Transporta- tion (O14) | O14+O1=0 | O14+O2=0 | O14+O3=0 | O14+O4=0 | O14+O5=0 | O14+O6=0 | O14+O7=0 |
| Media & Publishing (O15) | O15+O1=0 | O15+O2=0 | O15+O3=0 | O15+O4=0 | O15+O5=0 | O15+O6=0 | O15+O7=0 |
| Retail (O16) | O16+O1=0 | O16+O2=0 | O16+O3=0 | O16+O4=0 | O16+O5=0 | O16+O6=0 | O16+O7=0 |
| B2B Services (O17) | O17+O1=0 | O17+O2=0 | O17+O3=0 | O17+O4=0 | O17+O5=0 | O17+O6=0 | O17+O7=0 |

FIG. 11B-3

| Pharmaceuticals: Including Prescription Medication Products (O8) | Fast Food & Quick Serve Restaurants: Including Fast Food Restaurant Chains & Related Establishments (O9) | Hospitality: Including Hotels, Motels, Resorts & Gaming Establishments (O10) | Consumer Financial Services: Including Retail Banks, Brokerage & Credit Card Services (O11) | Wireless Communications (Consumer): Including Cellular & PCS Wireless Communications Services (O12) | Long Distance Communications (Consumer): Including Land-Line Long Distance Communications Services (O13) | Travel & Transportation: Including Air, Rail & Ground Passenger Transportation Services (O14) |
|---|---|---|---|---|---|---|
| O1+O8=3 | O1+O9=1 | O1+O10=0 | O1+O11=0 | O1+O12=0 | O1+O13=0 | O1+O14=0 |
| O2+O8=0 | O2+O9=0 | O2+O10=0 | O2+O11=0 | O2+O12=0 | O2+O13=0 | O2+O14=0 |
| O3+O8=0 | O3+O9=0 | O3+O10=0 | O3+O11=0 | O3+O12=0 | O3+O13=0 | O3+O14=0 |

FIG. 11B-4

| O4+O8=0 | O4+O9=0 | O4+O10=0 | O4+O11=0 | O4+O12=0 | O4+O13=0 | O4+O14=0 |
|---|---|---|---|---|---|---|
| O5+O8=0 | O5+O9=0 | O5+O10=0 | O5+O11=0 | O5+O12=0 | O5+O13=0 | O5+O14=0 |
| O6+O8=0 | O6+O9=0 | O6+O10=0 | O6+O11=0 | O6+O12=0 | O6+O13=0 | O6+O14=0 |
| O7+O8=0 | O7+O9=0 | O7+O10=0 | O7+O11=0 | O7+O12=0 | O7+O13=0 | O7+O14=0 |
| O8+O8=3 | O8+O9=0 | O8+O10=0 | O8+O11=0 | O8+O12=0 | O8+O13=0 | O8+O14=0 |
| O9+O8=0 | O9+O9=3 | O9+O10=3 | O9+O11=2 | O9+O12=1 | O9+O13=0 | O9+O14=3 |
| O10+O8=0 | O10+O9=3 | O10+O10=3 | O10+O11=3 | O10+O12=1 | O10+O13=2 | O10+O14=3 |
| O11+O8=0 | O11+O9=1 | O11+O10=1 | O11+O11=3 | O11+O12=1 | O11+O13=0 | O11+O14=1 |

FIG. 11B-5

| O12+O8=0 | O12+O9=1 | O12+O10=1 | O12+O11=1 | O12+O12=3 | O12+O13=3 | O12+O14=0 |
| --- | --- | --- | --- | --- | --- | --- |
| O13+O8=0 | O13+O9=0 | O13+O10=1 | O13+O11=1 | O13+O12=2 | O13+O13=3 | O13+O14=0 |
| O14+O8=0 | O14+O9=1 | O14+O10=2 | O14+O11=0 | O14+O12=0 | O14+O13=0 | O14+O14=3 |
| O15+O8=0 | O15+O9=0 | O15+O10=1 | O15+O11=1 | O15+O12=0 | O15+O13=1 | O15+O14=1 |
| O16+O8=0 | O16+O9=2 | O16+O10=2 | O16+O11=1 | O16+O12=0 | O16+O13=0 | O16+O14=1 |
| O17+O8=0 | O17+O9=0 | O17+O10=0 | O17+O11=0 | O17+O12=0 | O17+O13=0 | O17+O14=0 |

FIG. 11B-6

| Media & Publishing: Including Magazines, Newspapers & Periodicals (O15) | Retail: Including Department, Mass Merchant & Specialty Stores (O16) | Business to Business Services: Including Accounting, Payroll & Third Party Data Processing Services (O17) |
|---|---|---|
| O1+O15=0 | O1+O16=0 | O1+O17=0 |
| O2+O15=0 | O2+O16=0 | O2+O17=0 |
| O3+O15=0 | O3+O16=0 | O3+O17=0 |

FIG. 11B-7

| O4+O15=0 | O4+O16=0 | O4+O17=0 |
| O5+O15=0 | O5+O16=0 | O5+O17=0 |
| O6+O15=0 | O6+O16=0 | O6+O17=0 |
| O7+O15=0 | O7+O16=0 | O7+O17=0 |
| O8+O15=0 | O8+O16=0 | O8+O17=0 |
| O9+O15=0 | O9+O16=3 | O9+O17=2 |
| O10+O15=1 | O10+O16=3 | O10+O17=2 |
| O11+O15=0 | O11+O16=1 | O11+O17=2 |

FIG. 11B-8

| O12+O15=0 | O12+O16=0 | O12+O17=1 |
| O13+O15=0 | O13+O16=0 | O13+O17=1 |
| O14+O15=0 | O14+O16=0 | O14+O17=0 |
| O15+O15=3 | O15+O16=0 | O15+O17=0 |
| O16+O15=0 | O16+O16=3 | O16+O17=0 |
| O17+O15=0 | O17+O16=0 | O17+O17=3 |

FIG. 11B-9

COMPUTERIZED APPARATUS FOR IDENTIFYING INDUSTRIES FOR POTENTIAL TRANSFER OF A JOB FUNCTION

CROSS-REFERENCE TO RELATED APPLICATIONS

This application is a continuation of, and therefore claims priority from, U.S. patent application Ser. No. 09/882,292 filed Jun. 15, 2001, which claims the benefit of provisional application Ser. No. 60/211,823 filed Jun. 15, 2000 and also claims the benefit of provisional application Ser. No. 60/242,043 filed Oct. 20, 2000; these related applications are hereby incorporated herein by reference.

TECHNICAL FIELD

The present invention relates to systems and methods for analyzing job functions across different industries, particularly for identifying employment options for individuals and for identifying appropriately qualified job candidate populations for employers.

BACKGROUND ART

It is known in the prior art to provide postings of available jobs in a wide range of categories, and it is similarly known in the prior art to provide postings of resumes of individuals seeking jobs. Such resume and job postings may be searched using software, such as the search engines available (at the time of filing) from the websites careerbuilder.com, hotjobs.com and monster.com.

Increasingly, firms that offer resume and job postings also provide career, job search, and recruiting counseling. In addition to their primary focus of providing resume and job postings, these firms provide access to: third party databases of company and recruiter information; advice on resume writing and distribution; general job search and career counseling for individuals; and other resources related to careers, executive searches, and recruiting. Examples of websites providing such services include (at the time of filing) headhunter.net, hotjobs.com, and monster.com.

Individuals looking for jobs, and employers looking for employees, may also use the services of recruiters. For example, executive recruiters often target an employer's direct competitors, when searching for candidates on the employer's behalf. Executive search and recruiting firms have developed sophisticated software, such as Korn Ferry's FutureStep.

Database software is also available to assist job seekers, recruiters, and employers in managing and storing information on contacts. Such software may be based, for example, on "Goldmine," "Act!" or Microsoft "Access" software. These systems use filtering and keyword search capabilities to manage contact information.

Company and recruiter databases (such as Hoover's "Company Database," and Kennedy Publications' "Directory of Executive Search Firms" and its CD-ROM SearchSelect) are also available, that enable generating lists, mail-merge files, and information on enterprises and recruiters for users to contact.

Employers may also retain outplacement firms to counsel, and logistically support, released employees in transitioning between jobs; and job seekers may retain career counselors to advise on changing jobs or careers.

Standardized tests, such as the Myers Briggs Type Indicator and the Johnson O'Connor aptitude tests, are also used for better matching individuals with jobs, corporate cultures, and careers. Such tests are designed to identify individuals' innate skills, aptitudes, psychological and personality traits, personal values, and interests.

SUMMARY OF THE INVENTION

In one embodiment, a computerized method of recommending industries for a job seeker's job search comprises:

in a first digital computer process, receiving input from a user, over a communications network, related to the job seeker's present job function and industry;

in a second digital computer process, using the job function input to access an industry correlation data structure, stored on a digital storage medium, that correlates, for the job function, a first industry with a set of second industries with respect to which a job function capability of the job function is potentially transferable;

in a third digital computer process, determining a set of recommended industries for the job seeker's job search by consulting the industry correlation data structure using the industry input; and in a fourth digital computer process, communicating an identification of the set of recommended industries to the user over the communications network.

In a further embodiment, a computerized method of recommending industries in which an employer may find a population of potential employees comprises:

in a first digital computer process, receiving input from a user, over a communications network, related to the employer's industry and to a job function of interest to the employer;

in a second digital computer process, using the job function input to access an industry correlation data structure, stored on a digital storage medium, that correlates, for the job function, a first industry with a set of second industries with respect to which a job function capability of the job function is potentially transferable;

in a third digital computer process, determining a set of recommended industries in which the employer may find a population of qualified potential employees; and in a fourth digital computer process, communicating an identification of the set of recommended industries to the user over the communications network.

In another embodiment of the invention there is provided a computerized method of identifying industries for potential transfer of a job function capability with respect to a first industry. The method of this embodiment includes:

in a first digital computer process, identifying a job function in the first industry; and in a second digital computer process, accessing a database stored on a digital storage medium, that correlates, for the job function, the first industry with a set of second industries with respect to which the job function capability is potentially transferable; and in a third digital computer process, using the database to identify the second industries.

In further related embodiments, using the database to identify the second industries comprises identifying industries into or out of which a job function capability is potentially transferable. In these embodiments, the database may quantify the degree of transferability between the first industry and each industry of the set of second industries. Additionally, the database may be associated with a communications network; for example, the database may be associated with a web server on the World Wide Web.

The related embodiments may also include, in a fourth digital computer process, identifying an enterprise, within at least one of the second industries; in one embodiment, the enterprise potentially has an employment opportunity with respect to an equivalent job function. Additionally, the related embodiments may include, in a fifth digital computer process, providing a user with a transferability rating; or, in a sixth digital computer process, an explanation of degree of transferability; for a transfer between the first industry and an industry of the set of second industries.

Furthermore, the related embodiments may include, in a seventh digital computer process, providing a user with a direct link, over a communications network, to a job posting source or resume posting source (such as a website). The link may be keyed to a destination job posting source based on a user's input concerning a job seeker, or to a destination resume posting source based on a user's input concerning a position to be filled.

The methods may also include receiving input from a user over a communications network (which may be the Internet) and identifying a job function based on such input. A transferability rating, or explanation of degree of transferability, for a transfer between the first industry and an industry of the set of second industries, may be communicated to the user over the communications network.

Furthermore, the related embodiments may include communicating a list of the second industries to the user over a communications network; the network may be the Internet, and the list may be limited according to preferences provided by the user. The preferences may include a desired skill set. The user may also be provided with further information on at least one of the second industries over the communications network. Also, a list of at least one enterprise (which may potentially have an employment opportunity with respect to an equivalent job function) within at least one of the second industries may be communicated to the user over the communications network (which again may be the Internet). Further information on an enterprise from the list of at least one enterprise may also be communicated.

Finally, the related embodiments may include providing the user with information on an employment contact at an enterprise from the list of at least one enterprise; or providing the user, over the communications network, with contact information for a recruiter, who may specialize in recruiting for an industry of the set of second industries, or recruiting for the job function. The information on an employment contact may be provided over the communications network. The list of at least one enterprise may also be restricted based upon size of company with which a job seeker has experience.

In a further embodiment, a method for maintaining a database on a digital storage medium, for use in identifying employment options, comprises:

providing a database, on a digital storage medium, for a job function in a first industry, that correlates the first industry with a set of second industries with respect to which a job function capability of the job function is potentially transferable; and in a digital computer process, updating the database's correlation of industries based upon feedback information provided by users who have used industry correlation information from the database.

In further related embodiments, updating the database's correlation may be performed using a preference analysis technique such as collaborative filtering, or using a preference matrix. In the latter case, the rows and columns of the preference matrix may correspond to rows and columns in an industry transferability data structure.

In another embodiment, a method of recommending industries for a job seeker's job search comprises:

in a first digital computer process, receiving input from a user, over a communications network, related to the job seeker's educational background;

in a second digital computer process, determining a set of recommended industries for the job seeker's job search by consulting a data structure correlating educational background with a set of industries, using the educational background input; and in a third digital computer process, communicating an identification of the set of recommended industries to the user over the communications network. In further related embodiments, the educational background input comprises a major subject area of study, a class taken, or a degree or certification obtained by the job seeker. Another further related embodiment comprises consulting a plurality of data structures, each data structure correlating, for a given job function, educational background with a set of industries.

In another embodiment, a method of recommending educational backgrounds from which an employer may find a population of potential employees comprises:

in a first digital computer process, receiving input from a user, over a communications network, related to the employer's industry and to a job function of interest to the employer;

in a second digital computer process, determining a set of educational backgrounds from which the employer may find a population of qualified potential employees, by accessing a data structure correlating the employer's industry with a set of educational backgrounds using the job function and industry input; and in a third digital computer process, communicating an identification of the set of educational backgrounds to the user over the communications network. In further related embodiments the set of educational backgrounds comprises a set of major subject areas of study, a set of classes taken, or a set of degrees or certifications obtained. The user may also be provided, in a fourth digital computer process, with a list of educational institutions providing educational backgrounds of the set of educational backgrounds.

In a further embodiment, a method of identifying industries for potential transfer of a job function capability with respect to a first industry comprises:

a. in a first digital computer process, identifying a job function in the first industry; and b. in a second digital computer process, using a symbolic representation of a job transfer between the first industry and a second industry, of a set of second industries with respect to which the job function capability is potentially transferable, to access a database on a digital storage medium that correlates, for the job function, the first industry with the set of second industries.

In further related embodiments, the symbolic representation comprises a job function symbol, an industry symbol, or a transfer operator. Using the symbolic representation may comprise accessing a transferability rating or text of an explanation of degree of transferability for a transfer between the first industry and the second industry. The symbolic representation may be used as an input language for a query to the database; and may be automatically generated based upon input provided by a user.

In a further embodiment, a method of identifying industries for potential transfer of a job function capability with respect to a first industry comprises:

a. in a first digital computer process, identifying a job function in the first industry; and b. in a second digital computer process, using a symbolic representation that categorizes a subject of a user's job transferability query to access a database on a digital storage medium, that correlates, for the job function, the first industry with a set of second industries with respect to which the job function capability is potentially transferable.

In further related embodiments, the subject is a job seeker, or the target population of an employer's search for potential employees. The symbolic representation may comprise a job function symbol, an industry symbol, an educational background symbol, a geographical location symbol, a company size symbol, or a hierarchical position symbol. The subject may be represented using symbols representing experience in more than one industry. Using the symbolic representation may comprise accessing a row of transferability ratings from a transferability matrix, or text of explanations of degree of transferability corresponding to a row of a transferability matrix. The symbolic representation may be used as an input language for a query to the database; and may be automatically generated based upon input provided by a user. The symbolic representation may also be used as an element in symbolically representing a job transfer between the first industry and the second industry.

In another embodiment, a method of recommending industries in which an employer may find a population of potential employees comprises:

in a first digital computer process, receiving input from a user, over a communications network, related to a desired skill set of interest to the employer;

in a second digital computer process, using the desired skill set input to access a data structure that correlates skill sets with industries;

in a third digital computer process, determining a set of recommended industries in which the employer may find a population of qualified potential employees by consulting the correlating data structure using the desired skill set input; and in a fourth digital computer process, communicating an identification of the set of recommended industries to the user over the communications network.

BRIEF DESCRIPTION OF THE DRAWINGS

The foregoing features of the invention will be more readily understood by reference to the following detailed description, taken with reference to the accompanying drawings, in which:

FIG. 1 (encompassing sub-part FIGS. 1-1 through 1-6) is a diagrammatic representation of an industry correlation data structure in accordance with an embodiment of the present invention providing a database that correlates, for a particular job function (here, marketing management) each of a first set of industries with other industries with respect to which a job function capability is potentially transferable as to such job function;

Figure 2A-8:
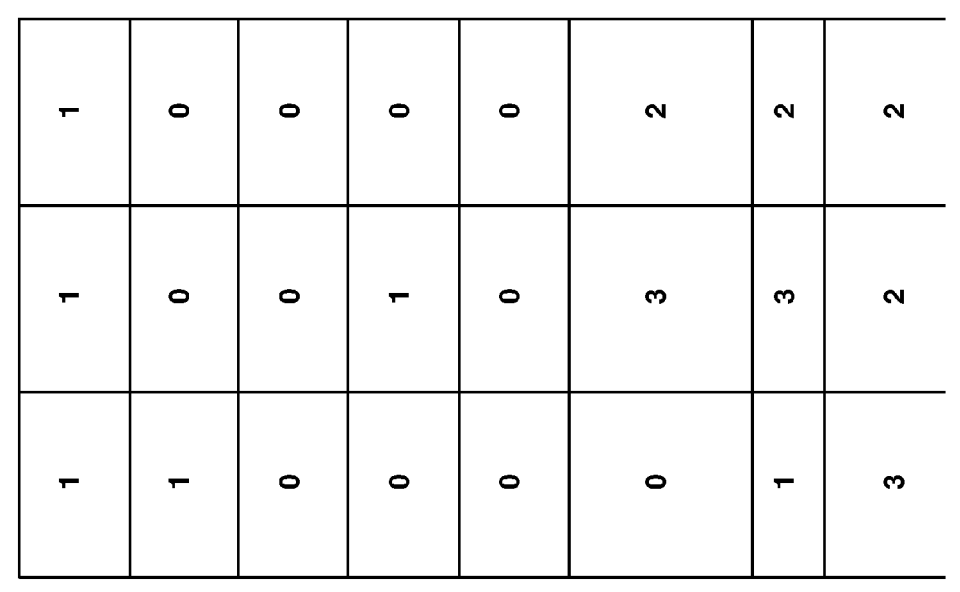
Figure 2A-9:
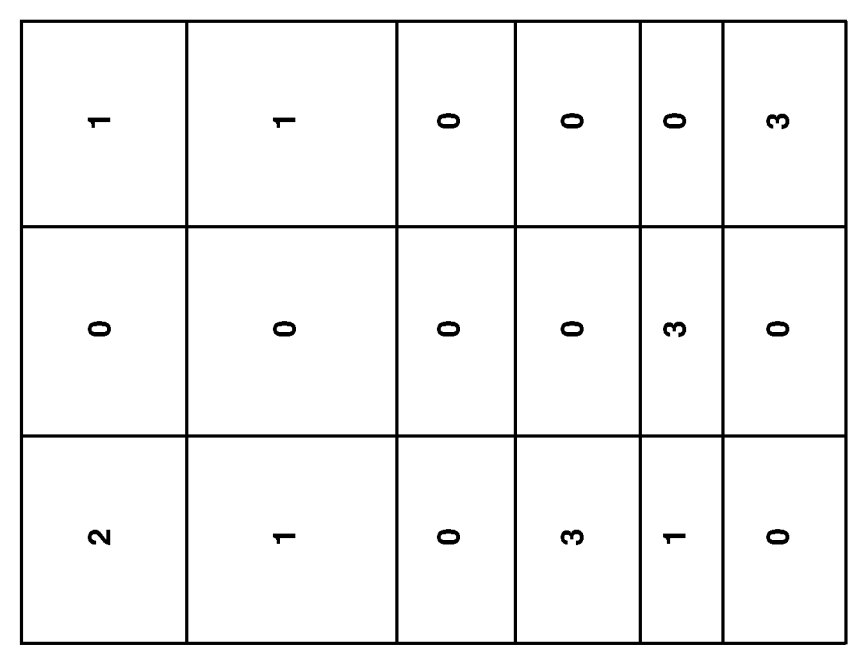

FIGS. 2A (encompassing sub-part FIGS. 2A-1 through 2A-9) and 2B (encompassing sub-part FIGS. 2B-1 through 2B-9) are diagrammatic representations of data structures, similar to that of FIG. 1, wherein the degree of transferability across industries has been quantified, in accordance with an embodiment of the invention;

FIG. 2C (encompassing sub-part FIGS. 2C-1 through 2C-3) illustrates a data structure wherein the degree of transferability of one job function in one industry has been quantified across different industries, in accordance with an embodiment of the invention;

FIG. 3 is a block diagram showing an embodiment of a method of identifying industries for potential transfer of a job function capability in accordance with an embodiment of the invention;

FIG. 4 is a block diagram of an embodiment, similar to that of FIG. 3, which is implemented using a computer system;

FIG. 5 is a diagram of an embodiment wherein a user's computer (or other network appliance) is in communication over the Internet with a server that provides information to the user's computer (or other network appliance) in response to a query from the user;

FIGS. 11A (encompassing sub-part FIGS. 11A-1 through 11A-9) and 11B (encompassing sub-part FIGS. 11B-1 through 11B-9) are diagrammatic representations of industry transferability data structures in accordance with an embodiment of the invention that uses a symbolic representation of industry transfers.

DETAILED DESCRIPTION OF SPECIFIC EMBODIMENTS

Definitions

Figure 6:
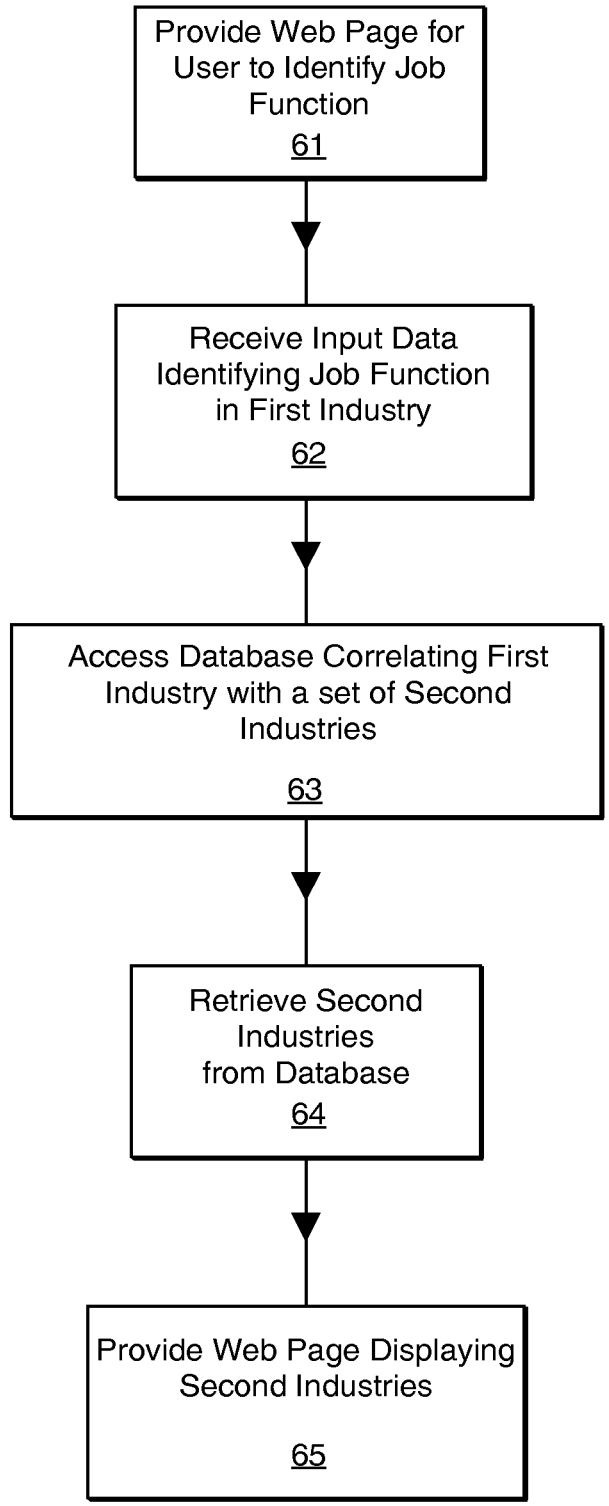
FIG. 6 is a block diagram of an embodiment, similar to that of FIG. 4, which is implemented using the embodiment of FIG. 5.

As used in this description and the accompanying claims, the following terms shall have the meanings indicated, unless the context otherwise requires:

An "enterprise" is a commercial, non-profit, governmental, or volunteer organization.

The "sector" of an enterprise is an economic category of the enterprise and is one of commercial, non-profit, governmental, or volunteer.

The "industry" of an enterprise is an activity carried out by the enterprise as part of its mission and for which the enterprise exists. In the case of a commercial enterprise, the "industry" of an enterprise is a line of business carried out by the enterprise, such as may be identified by a standard industry classification.

A "job function" associated with an enterprise of a given industry is a function carried out by one or more individuals associated with the enterprise of the given industry in furtherance of a mission of the enterprise.

A "job function capability" of an individual is a capability of the individual to perform a job function in a given industry. An individual may gain such a capability, for example, from experience in performing a particular job function.

A "skill set" is the set of competencies required of an individual to perform a job function.

A "variable" is a characteristic or condition of an industry or market, familiarity with which is an important factor in competent performance of a job function in that industry or market.

The "job level" of an individual in a job function in an enterprise is the position occupied by the individual in any hierarchy established for carrying out the job function in the enterprise.

An embodiment in accordance with the present invention provides an automated system for recommending employment options, based on functional similarities between jobs performed in different industries. Job seekers can use the automated system to discover employment options in industries outside their own, and employers can use the automated system to discover sources of qualified potential employees in industries outside their own. The system can automatically provide not only industries, but also specific enterprises within industries, to broaden a user's options. Such a system is particularly useful for automating the initial stages of a job search tailored to a subject's background; and for automating, for an employer, the initial stages of an executive search.

One step in the operation of such an automated system is to identify, for a job function capability of a job function performed in a first industry, a set of corresponding industries with respect to which the job function capability is similar, and therefore potentially transferable. Thus, for example, for the marketing management job function in the Consumer Financial Services industry, an automated system in accordance with embodiments of the invention can provide a corresponding set of industries (such as the Hospitality, Wireless Telecommunications, Long Distance Telecommunications, Travel and Transportation, Media and Publishing, Retail, and Business-to-Business Services industries) with respect to which a job function capability of the marketing management job function (or the corresponding equivalent job function in each industry) is potentially transferable.

Another step in the operation of such an automated system is to provide a database correlating the first industry with the set of second industries with respect to which the job function capability is potentially transferable; and to use the database to identify the second industries. Thus, using the example of the previous paragraph, a database is provided that correlates the Consumer Financial Services industry with the corresponding industries (such as Hospitality, Wireless Telecommunications, Long Distance Telecommunications, Travel and Transportation, Media and Publishing, Retail, and Business-to-Business Services); and then the database is used to identify the corresponding industries to a user.

FIG. 1 is a diagrammatic representation of an industry correlation data structure in accordance with an embodiment of the present invention providing a database that correlates, for a particular job function (here, marketing management) each of a first set of industries with other industries. The industries listed as row headings and column headings have been analyzed in the context of the job function of marketing management. For each first industry listed as a row heading on the left of the figure, an "X" or a blank has been placed in each box where that row intersects with a column corresponding to a second industry, listed as a column heading at the top of the figure. An "X" is placed in a box when the marketing management job function uses a skill set, and works with variables, in the row industry in a way that enables a subject's job function capability to be transferred to the column industry. The box is left blank when the potential for such a transfer is not present.

One possible use of the data structure of the embodiment of FIG. 1 is to identify industries to which a job seeker may transfer his or her job function capabilities. Thus, for example, a marketing manager in the Travel and Transportation industry who is looking for a new job can use the data structure to find industries, other than the Travel and Transportation industry, to which his or her job function capabilities are transferable. In such a case, when moving across the row corresponding to the industry in which the job seeker has experience, each industry listed in a column marked with an "X" is an industry to which the job seeker's job function capabilities are transferable. By enabling the provision of a list of such industries, the data structure of the embodiment of FIG. 1 greatly expands the options available to job seekers, who might otherwise not be aware that their skills are transferable to other industries.

Another possible use of the data structure of the embodiment of FIG. 1 is to identify industries from which an employer may recruit potential employees. Thus, for example, a company in the Travel and Transportation industry that wishes to hire a marketing manager can use the data structure to find industries, other than the Travel and Transportation industry, from which to recruit marketing managers to fill the job. In this case, the data structure functions in the reverse fashion from that previously described for job seekers. That is, moving down the column corresponding to the employer's industry, each industry listed in a row marked with an "X" is an industry from which the employer may recruit potential employees. The data structure of the embodiment of FIG. 1 thus also expands the options available to employers, who might otherwise not be aware of industries outside their own from which to recruit potential employees.

The data structure of the embodiment of FIG. 1 is not necessarily symmetric, because job function capabilities are not necessarily transferable in a symmetric fashion. For example, in FIG. 1, a marketing manager in the consumer package goods industry is indicated as being able to transfer to the pharmaceuticals industry. However, the reverse is not indicated: a marketing manager in the pharmaceuticals industry is not indicated as being able to transfer to the consumer package goods industry. Such an asymmetry may occur when a job function capability in one industry involves skills that are widely generalizable to other industries in which the same job function capability involves more specific expertise. This potential asymmetry should be noted for the embodiment of FIG. 1: moving across the rows indicates industries to which a transfer is possible, out of the industry indicated in the row heading; moving down the columns indicates industries from which a transfer is possible, into the industry indicated in the column heading. A common feature of both of these uses of the data structure of the embodiment of FIG. 1 is that in both cases, industries are identified for potential transfer of a job function capability with respect to a first industry.

It should be understood that, while the data structure of the embodiment of FIG. 1 has been discussed in terms of job seekers and employers, the invention is not limited to such applications, but is instead applicable to a wide range of situations in which an understanding of cross-industry transfer of job function capabilities is desirable. For example, students may use the data structure when considering the ramifications of career choices; and recruiters may use the data structure to identify avenues of candidate development.

In accordance with one embodiment of the invention, the industries on the axes of a data structure such as that of FIGS. 1, 2A-2B, and 11A-11B (below) may comprise a subset of (or all of) the industries provided by a standard industry classification system. For example, the industries may be a subset of the industries categorized in the North American Industry Classification System (NAICS), available at the time of filing from the National Technical Information Service of the U.S. Department of Commerce, at the website:

http://www.ntis.gov/product/naics.htm.

Figure 2A-6:
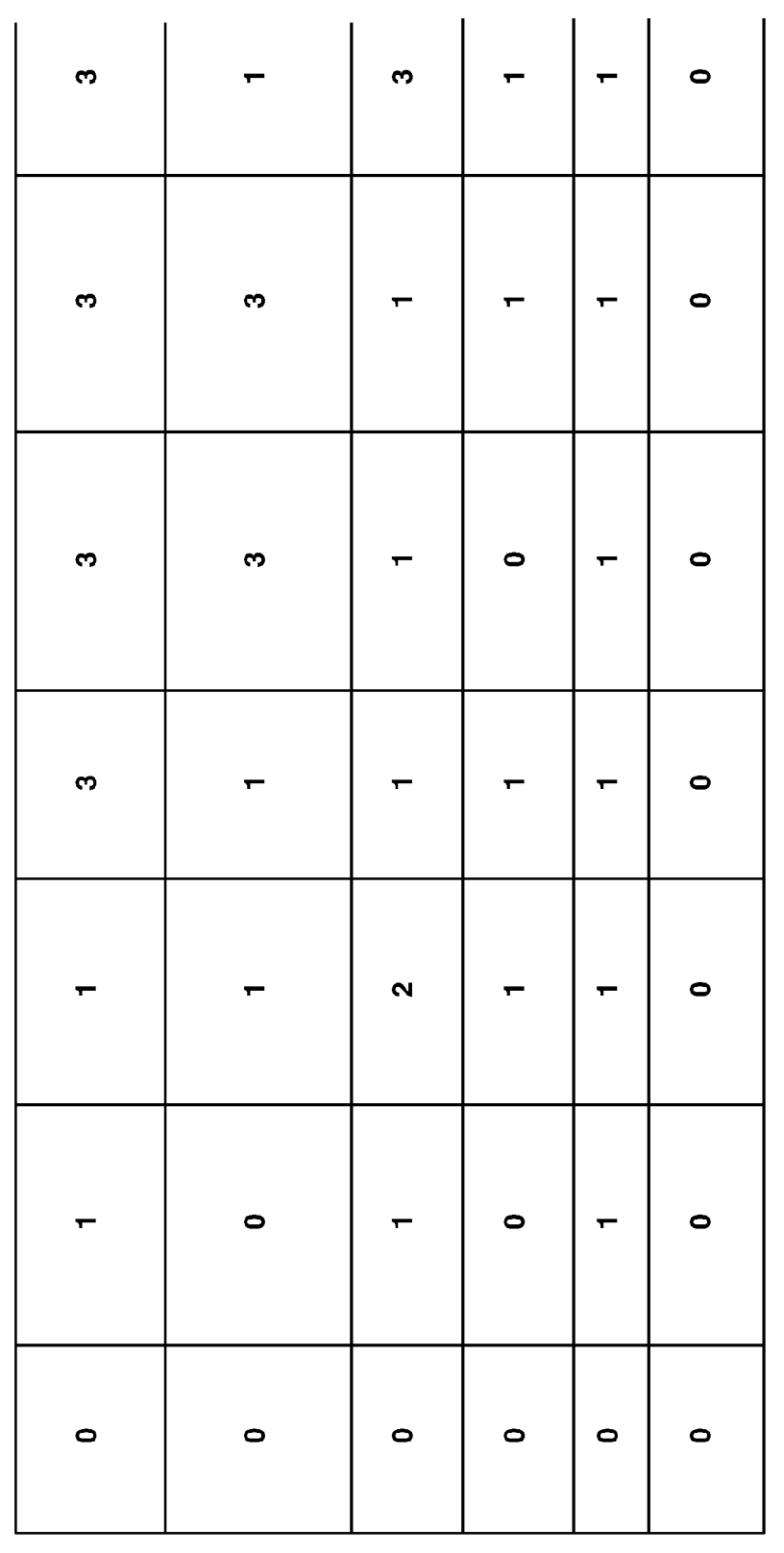

Figure 2B-8:
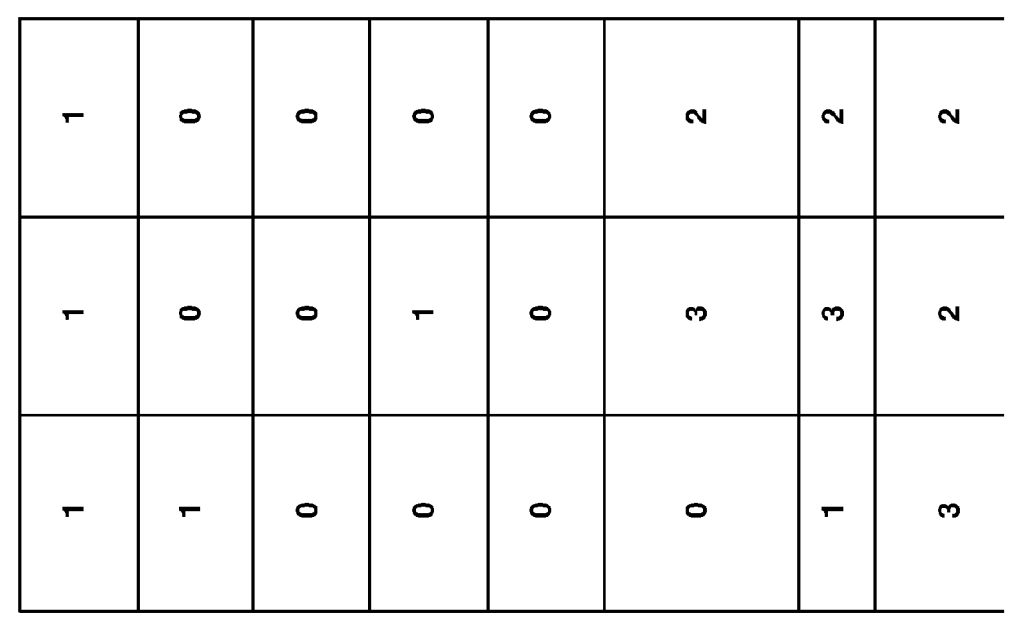
Figure 2B-9:
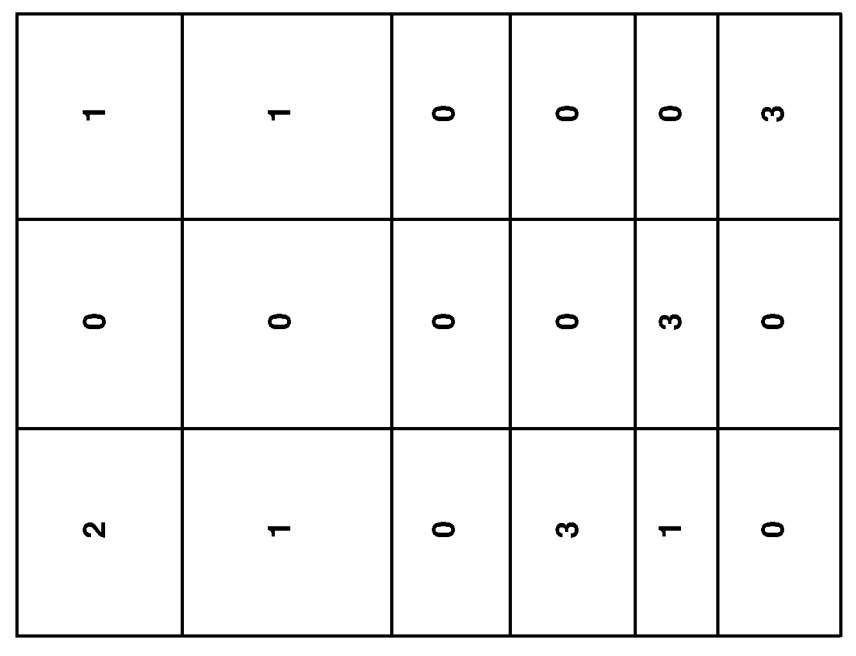

The embodiments of FIGS. 2A and 2B are diagrammatic representations of data structures, similar to that of FIG. 1, wherein the degree of transferability across industries has been correlated and quantified. In this case, in lieu of an "X", there is utilized a numeric indicator to show the degree of transfer potential. Hence "3" indicates the greatest transfer potential, "2" indicates moderate transfer potential, "1" indicates slight transfer potential, and "0" indicates no transfer potential. The data structures of the embodiments of FIGS. 2A and 2B enable more nuanced recommendations. For example, in FIG. 2A, a job seeker may be advised of industries to which his or her job function capabilities have a greater or lesser ability to be transferred. A wide variety of quantification schemes may be used in accordance with embodiments of the invention, including a binary scheme.

FIG. 2C illustrates a data structure wherein the degree of transferability of one job function in one industry (here, the marketing management job function in the consumer package goods industry) has been quantified across different industries, in accordance with an embodiment of the invention. In one embodiment, the data structure of FIG. 2C is used to present, to a user, output of identified industries for potential transfer of a job function capability with respect to a first industry (here, the consumer package goods industry).

FIG. 3 is a block diagram showing an embodiment of a method of identifying industries for potential transfer of a job function capability with respect to a first industry, in accordance with an embodiment of the invention. In box 31 the method involves identifying a job function in the first industry. In box 32 the method involves providing a database correlating, for the job function, the first industry with a set of second industries with respect to which the job function capability is potentially transferable. In box 33, the method involves using the database to identify the second industries.

FIG. 4 is a block diagram of an embodiment, similar to that of FIG. 3, which is implemented using a computer system. In box 41 the embodiment involves receiving input data identifying a job function in a first industry. In box 42, the embodiment involves using the input data to access a database, on a digital storage medium, that correlates, for the job function, the first industry with a set of second industries with respect to which a job function capability of the job function is potentially transferable. In box 43, the method involves retrieving from the database identification of the second industries.

FIG. 5 is a diagram of an embodiment wherein a user's computer (or other network appliance) 51 is in communication over the Internet 54 with a server 52. The server 52 provides information from a database 53, with which the server is in communication, to the user's computer (or other network appliance) 51 in response to a query from the user. In this embodiment, the server 52 can be configured to provide information to the user that is similar to the information accessible in the database illustrated in FIG. 1. A process for operating the server of this embodiment is discussed in connection with FIG. 6 below.

FIG. 6 is a block diagram of an embodiment, similar to that of FIG. 4, which may be implemented using the embodiment of FIG. 5. In box 61 the server 52 is caused to provide a web page to the user's computer (or other network appliance) 51 of FIG. 5. In box 62, the server receives input data from the user's computer (or other network appliance) identifying a job function in a first industry. In box 63, the input data is used to access a database, on a digital storage medium, that correlates, for the job function, the first industry with a set of second industries with respect to which a job function capability of the job function is potentially transferable. In box 64, there is retrieved from the database identification of the second industries. In box 65, the server provides a web page for the user's computer (or other network appliance) displaying these second industries.

Figure 7:
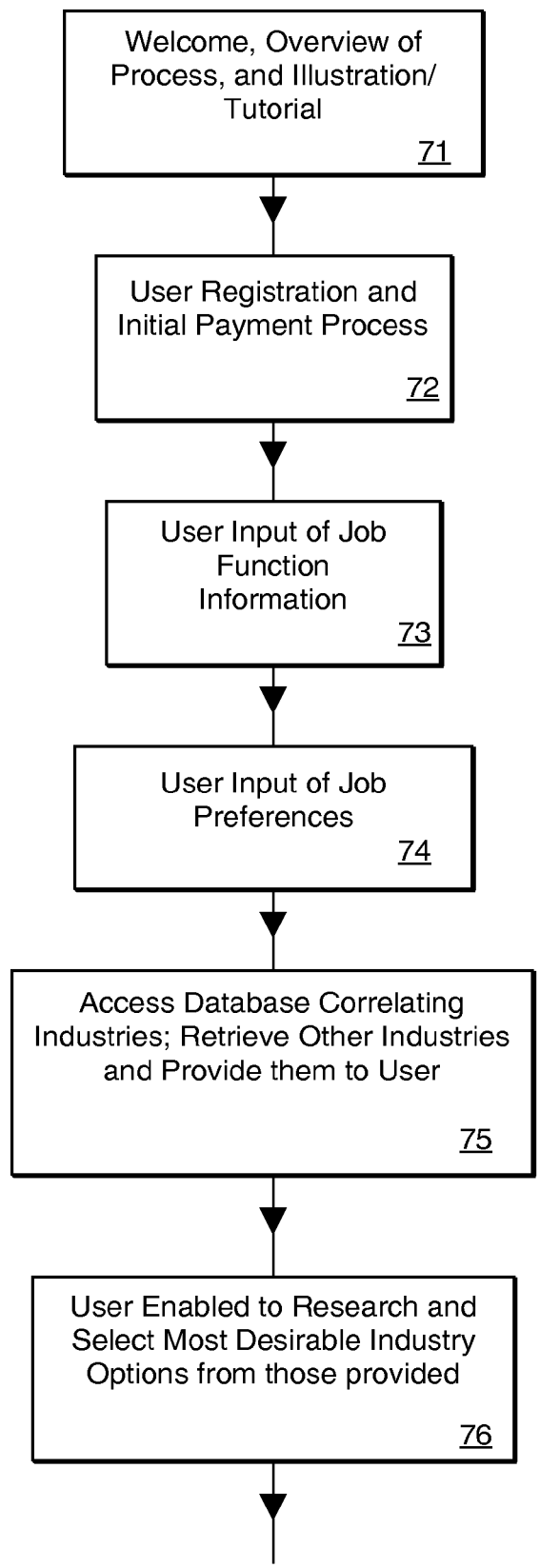
FIGS. 7-8 are block diagrams summarizing a process, in accordance with an embodiment of the invention, for identifying industries and enterprises to which a job seeker's job function capabilities are potentially transferable.
Figure 8:
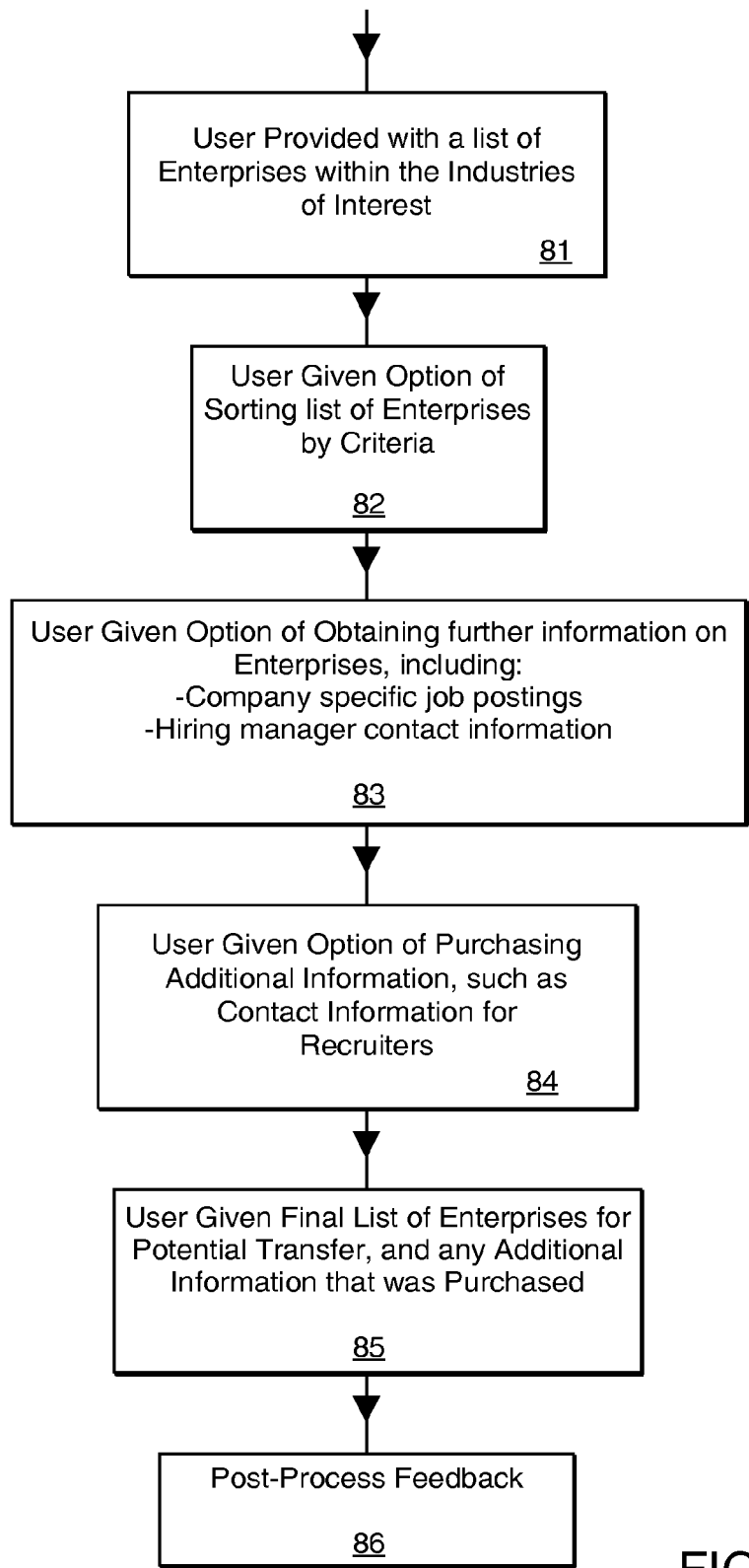

FIGS. 7-8 are block diagrams summarizing a process, in accordance with an embodiment of the invention, for identifying industries and enterprises to which a job seeker's job function capabilities are potentially transferable. Such a process flow may be implemented by a server with which a user's computer (or other network appliance) communicates over a communications network (such as the Internet), in a similar fashion to that of the embodiment of FIG. 5. For example, the process flow may be implemented by a web server on the World Wide Web.

In step 71 of the embodiment of FIGS. 7-8 (which corresponds to steps 1-3 of the embodiment of Appendix A and Screens 1-3 of the embodiment of Appendix C), a system that implements the process flow welcomes the user. The user need not be the job seeker himself or herself, but may also be anyone having information relating to a job seeker. The system summarizes the process flow for the user, and provides an illustration or tutorial to show how the user interacts with the system. Next, in step 72 (corresponding to Step 4 of the embodiment of Appendix A and Screen 4 of the embodiment of Appendix C), the user registers by entering contact information—for example, the user's name, address, telephone number, and e-mail address. The user also enters initial payment information such as credit card information.

Next, in step 73 of the embodiment of FIGS. 7-8 (corresponding to steps 5-6 of the embodiment of Appendix A and Screens 5-12 of the embodiment of Appendix C), the system requests information from the user related to the job seeker's prior job functions. The user may supply only the job seeker's job function at a current or most recent job; or may supply the job seeker's job function at more than one previous job. For each job function, the system may be structured to elicit from the user, for example: the job function type; the hierarchical level at which the job seeker performed the function; the number of years that the job seeker performed the function; reporting relationships for the job seeker, in the job function; the name of the company at which the job seeker worked; the name of the division; the enterprise type; the industry type; the company size (in revenue or sales); and the company location.

In step 74 of the embodiment of FIGS. 7-8 (corresponding to step 7 of the embodiment of Appendix A and Screens 13-15 of the embodiment of Appendix C), the system presents the user with screens that elicit the job seeker's preferences with respect to desired job functions, hierarchical levels, and industries for potential transfer. These preferences are ultimately used to narrow the list of enterprises that is provided to the user for potential transfer; and to identify appropriate employment contacts at the list of enterprises that is provided. Before narrowing by preferences, the list is otherwise based on transferability across industries for a given job function, as will be seen below.

Next, in step 75 of the embodiment of FIGS. 7-8 (corresponding to steps 8-11 of the embodiment of Appendix A and Screens 16-18 of the embodiment of Appendix C), the system processes the user's input to identify systematically industries to which the job seeker's job function capabilities are potentially transferable. For each job function and industry specified by the user, the system accesses a client server database that correlates, with the job function in the industry, other industries with respect to which the job seeker's capabilities are potentially transferable. The system then lists such industries for the user. In the event that the user specifies more than one job function, the list of industries combines the industries that were retrieved from the database using all of the job functions specified. The list of industries may be limited by the user's preferences, which were input in step 74. The user may also be enabled to access an explanation of degree of transferability to each of the listed industries; such explanations are particularly useful, for example, for inclusion in a job seeker's cover letter to potential employers in the listed industries.

In order to generate the list of industries for each job function, the system may consult a client server database containing data structures similar to those of the embodiments of FIGS. 1, 2A-2B and 11A-11B (below). Such a data structure is accessible for each job function. For example, the data structure of FIG. 1 corresponds to the Marketing Management job function, but a different data structure may be needed to determine transferability of job function capabilities for a different job function. Each data structure need not have the same industries on its axes; data structures may instead be configured such that only relevant industries are present in the data structure corresponding to each job function.

In one embodiment, the system provides different industry transferability data structures for a single job function, depending on the size of the company in which the job seeker performed the job function.

Once the system has provided the user with a list of industries for potential transfer, it saves the list in a digital storage medium associated with the client server database, such that the list is retrievable using a unique identifier established for each user. The system also gives the user the opportunity to save the list in a digital storage medium associated with the user's own computer (or other network appliance).

In step 76 of the embodiment of FIGS. 7-8 (corresponding to steps 12-13 of the embodiment of Appendix A), the system next gives the user the option of researching any of the listed industries in which he or she is most interested; and of selecting them for subsequent output. In one embodiment, the system allows the user to research the listed industries before selecting them (for example by clicking on an HTML link from the industry name). In this case, the system is linked to a database containing information on each industry; the database may be the system's own client server database, or a third party database. The industry information may be, for example, industry profiles, or a list of leading companies in the industry. The system allows the user to move back and forth between the industry information and the selection list, until finished with the research and selection process.

Next, in step 81 of the embodiment of FIGS. 7-8 (corresponding to steps 14-16 of the embodiment of Appendix A and Screen 19 of the embodiment of Appendix C), the system provides the user with a list of enterprises within the selected industries, organized by industry as shown in Screen 19 of Appendix C. The system automatically saves the list of enterprises in a digital storage medium, associated with a unique identifier for each user. In one embodiment, the enterprises may be stored associated with the relevant job functions and industries. The user is also given the option of saving the list of enterprises to the user's own digital storage medium.

In one embodiment, the list of enterprises is restricted based upon characteristics of the companies at which the job seeker has worked, such as size of company, or whether the company is public or private; these characteristics were entered by the user in step 73, described above. In such an embodiment, the system processes the user's input from step 73 to determine the size (or other characteristic) of the companies at which the job seeker has worked. Each enterprise of the potential enterprises for recommending to the user is associated, in the database, with a size restriction parameter, which varies with the enterprise's size. Depending on the range of size of the companies entered in step 73 (as given, for example, by revenues or sales), the list of enterprises output can then be restricted to those companies that are associated with a size restriction parameter within given ranges. Thus, for example, there may be two size restriction parameter ranges (corresponding to "small" and "large" companies). A job seeker having experience in companies of varying size (i.e. companies that are both above and below a given revenue level) may be recommended enterprises from both the small and large company parameter ranges; whereas a job seeker having experience only in companies that are either below or above the given revenue level may be recommended enterprises from only the small or large company parameter range (respectively). Those of skill in the art will appreciate that other translation schemes may be used between the job seeker's company size experience, and the size of enterprises listed as recommendations.

The system next gives the user the option of sorting the list of enterprises, in step 82 of the embodiment of FIGS. 7-8 (corresponding to steps 17-22 of the embodiment of Appendix A and Screens 20-21 of the embodiment of Appendix C). The list may be sorted, for example, by geographical location, enterprise type, or by industry rank in a well-known industry ranking scale such as the Fortune 500, Fortune 1000, INC. 500, Top Twenty, or Most Admired ranking scales. The system stores the sorted lists of enterprises in an associated database; in the database, each list is associated with a unique identifier for the user. The user is also given the option of saving the sorted lists to the user's own digital storage medium.

Next, the user is given the option of including the sorted and listed companies in a mail-merge file, complete with full mailing addresses. The user is also given the option of researching the listed enterprises before including them in the mail-merge file. For example, the user may be enabled to research company profiles, SEC filings, recent news, stock performance, annual reports, and other information on the listed enterprises. In one embodiment, the user accesses a database containing such information by selecting an enterprise from the list. The database may be one that is owned by parties, other than those who administer the system, who specialize in providing in-depth research on enterprises; or it may be the client server database itself. The system enables the user to select enterprises from the list for inclusion in a final list of enterprises that are of interest. It also enables the user to move back and forth between the list of enterprises (with selected enterprises marked) and the information obtained by researching in the database, until the user indicates that he or she has completed the research and selection process. The user is then given a list of selected enterprises complete with mailing addresses in a mail-merge format. The list may be formatted, for example, in the manner shown in Screen 21 of Appendix C.

Next, in step 83 of the embodiment of FIGS. 7-8 (corresponding to steps 23-33 of the embodiment of Appendix A and Screens 22-23 of the embodiment of Appendix C), the system gives the user the option of retrieving a list of enterprise-specific job postings. These may be retrieved, for example, from company and recruiter websites, or from job posting boards. In one embodiment, the system uses a search engine to search the Internet using key word search techniques, or other filtering techniques. In another embodiment, the system is linked to entities that provide listings of employment opportunities, such as electronic job boards. In this embodiment, the system initiates a search of the employment opportunities listed with such entities, and provides a listing of posted employment opportunities at each of the listed enterprises, within the specified job functions. In one alternative embodiment, the system provides the user with a direct link, over a communications network, to a job posting source (for example, to a website such as hotjobs.com) or a direct link to a job posting source of one of the listed enterprises (such as a company's website). Such a link may be provided, for example, as an HTML link from a listed industry or enterprise. The link may also be keyed directly to a relevant industry section or specific job posting at a destination job posting source. Such keying may be determined based on the system's listing of industries and enterprises, or the user's job seeker input (such as inputs regarding the job seeker's preferences). In another alternative embodiment, the client server database itself may contain listings of employment opportunities available for given job functions within enterprises, and the system may access these listings in order to provide the user with a list of enterprise-specific employment opportunities.

Also in step 83, the user is given the option of obtaining a list of contact information that enables the user to send mail directly to the potential hiring manager at the selected enterprises. In one embodiment the contact information is the name, title, and address of a functional head or corporate officer at the selected enterprise that is most likely to be in a hierarchical position to make line hiring decisions for the user's job function and hierarchical level. This information may be gleaned from the client server database, or from another database with which the system associates.

Next, the system provides the user with a list of the selected enterprises, together with mailing addresses, enterprise specific job postings, and information on contacts at those enterprises. The list may be formatted, for example, in the manner shown in Screen 23 of Appendix C. The system may also arrange the list of enterprises according to the sorting criteria provided in step 82, above. The system saves the list of enterprises, along with the corresponding contact information and enterprise-specific job postings, in a digital storage medium, and uniquely associates the data with an identifier for each user. The user is also given the opportunity to save the data to the user's own digital storage medium.

In step 84 of the embodiment of FIGS. 7-8 (corresponding to steps 34-36 of the embodiment of Appendix A, and Screen 24 of the embodiment of Appendix C), the user is given the option of purchasing additional information, such as contact information for recruiters.

In step 85 of the embodiment of FIGS. 7-8 (corresponding to steps 37-39 of the embodiment of Appendix A, and Screens 25-26 of Appendix C), the user is given a final list of enterprises for potential transfer, as described in step 83, as well as a listing of any additional information that was purchased in step 84.

Finally, in step 86 of the embodiment of FIGS. 7-8 (corresponding to steps 40-42 of the embodiment of Appendix A, and Screens 49-50 of Appendix C), the system allows the user to give post-process feedback. This feedback may include immediate feedback, such as feedback about the system's operation; and longer-term feedback, such as feedback about the success of a user's job transition.

Figure 9:
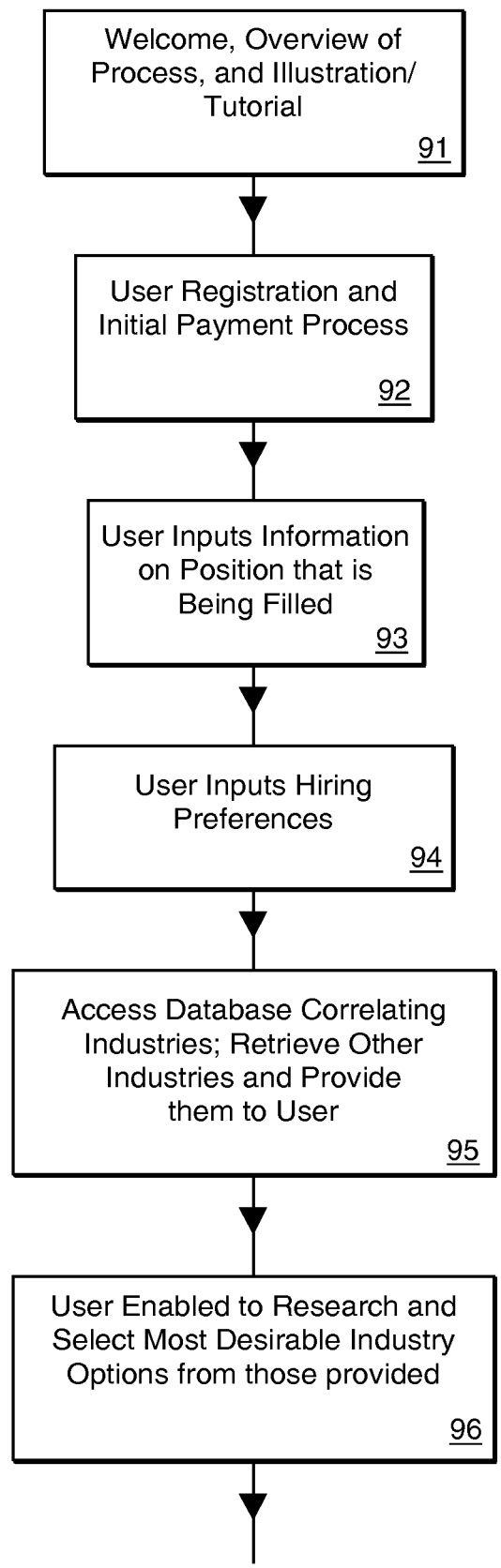
FIGS. 9-10 are block diagrams summarizing a process in accordance with an embodiment of the invention, for identifying industries and enterprises from which potential employees' job function capabilities are potentially transferable.
Figure 10:
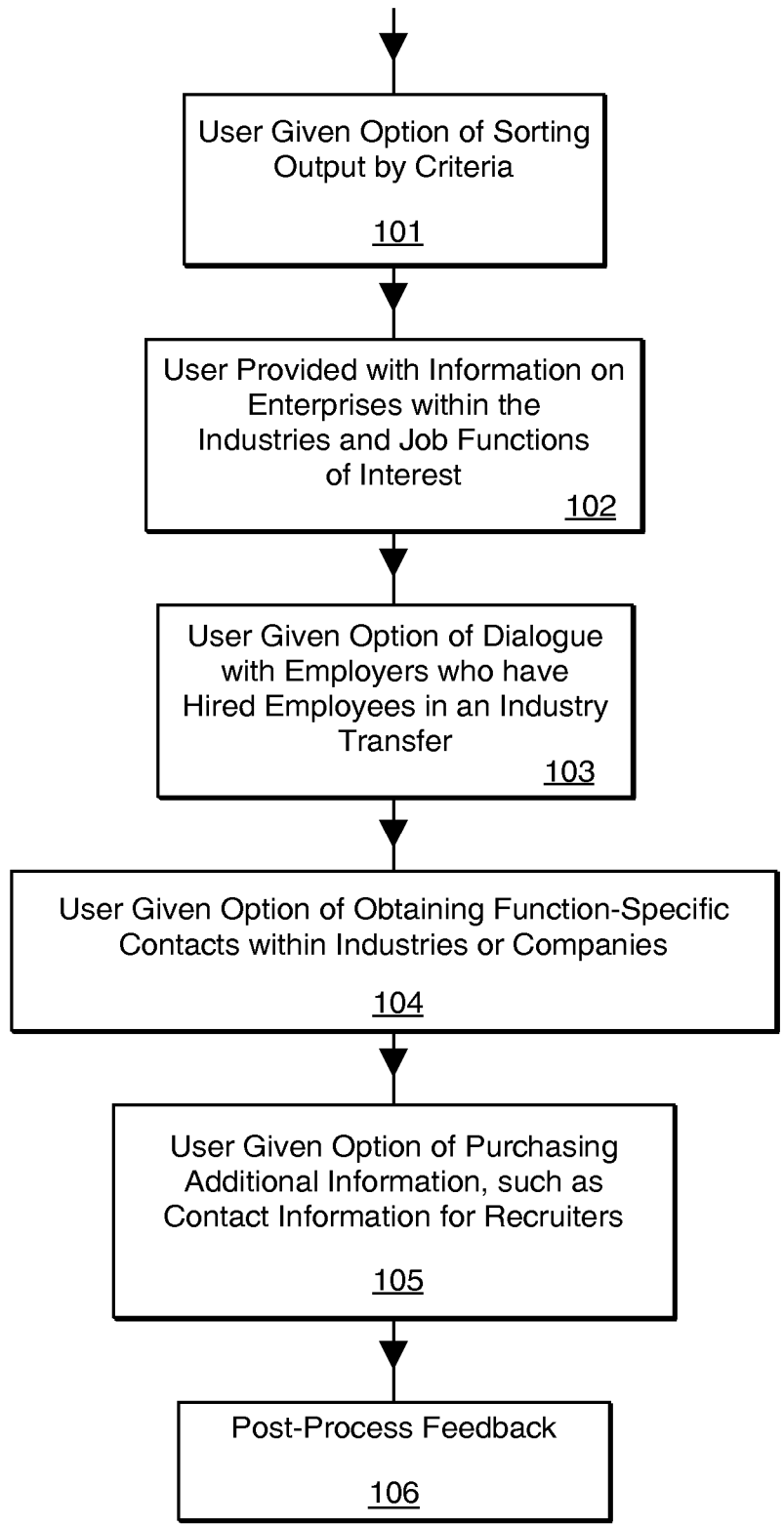

Next we discuss the embodiment of FIGS. 9-10. These figures are block diagrams summarizing a process in accordance with an embodiment of the invention, for identifying industries and enterprises from which potential employees' job function capabilities are potentially transferable. In particular, this embodiment is useful for recommending industries and enterprises where an employer may find potential employees with particular skill sets and expertise, and from which an employer may recruit potential employees, based on the similarity of skill sets utilized, and variables worked with, in job functions in different industries.

As with the embodiment of FIGS. 7-8, such a process flow may be implemented by a server with which a user's computer (or other network appliance) communicates over a communications network (such as the Internet), in a similar fashion to that of the embodiment of FIG. 5. For example, the process flow may be implemented by a web server on the World Wide Web.

In step 91 and 92 of the embodiment of FIGS. 9-10 (corresponding to steps 1-4 of the embodiment of Appendix B, and Screens 1-4 of the embodiment of Appendix C), the system welcomes the user and conducts a user registration and payment process, in a similar fashion to that of steps 71-72 of the embodiment of FIGS. 7-8.

In step 93 of the embodiment of FIGS. 9-10 (corresponding to step 5 of the embodiment of Appendix B, and Screens 27-34 of the embodiment of Appendix C), the user inputs information on the position that is being filled. Among other things, the user inputs the job function and level of the position that is being filled.

In step 94 of the embodiment of FIGS. 9-10 (corresponding to step 6 of the embodiment of Appendix B, and Screens 35-40 of the embodiment of Appendix C), the user inputs hiring preferences, by which the system's output may be limited. For instance, the user may be interested in hiring from certain geographic areas or industries; or in hiring those who have acquired certain skill sets (which may be found only in certain job functions and/or industries).

In step 95 of the embodiment of FIGS. 9-10 (corresponding to steps 7-11 of the embodiment of Appendix B, and Screens 41-43 of the embodiment of Appendix C), the system processes the user's input to identify systematically industries from which potential employees' job function capabilities are transferable, into the industry of interest to the user. For each job function and industry specified by the user, the system accesses a client server database that correlates, with the job function in the industry, other industries in which suitable potential employees may be found. The system then lists such industries for the user.

The list of industries may be limited by the user's preferences, which were input in step 94. For example, if the user prefers a desired skill set (see Screen 40 of Appendix C), then the list of industries may be reduced such that only those industries remain where such a skill set is likely to be found. In order to be able to limit the industry list based on a user's skill set preferences, each job function/industry combination may be associated, in the database, with data signifying the presence or absence of a given skill set for that job function/industry combination. In one embodiment, such an association allows use of the database for recommending industries to an employer based directly on input of a desired skill set, without the need for the user to input information about the employer's industry. In such an embodiment, a user's input of an employer's desired skill set causes the system to implement a search through the skill set data that is associated with the job function/industry combinations in the database. A list of the job function/industry combinations that have the desired skill set is then provided to the user; alternatively, industries or job functions alone are listed. In one embodiment, the use of skill set data in the database allows the system to ignore industry inputs when the user does specify a desired skill set, and to rely solely on the skill set input.

The user may also be enabled to access an explanation of degree of transferability from each of the listed industries.

In order to generate the list of industries, the system may consult a client server database containing data structures similar to those of the embodiments of FIGS. 1, 2A-2B, and 11A-11B (below). Such a data structure is accessible for each job function. For example, the data structure of FIG. 1 corresponds to the Marketing Management job function, but a different data structure may be needed to show transferability of job function capabilities for a different job function. Each data structure need not have the same industries on its axes; data structures may instead be configured such that only relevant industries are present in the data structure corresponding to each job function.

In one embodiment, the system provides different industry transferability data structures for a single job function, depending on the size of the company in which the position that is being filled is performed.

Once the system has provided the user with a list of industries in which potential employees may be found, it saves the list in a digital storage medium associated with the client server database, such that the list is retrievable using a unique identifier established for each user. The system also gives the user the opportunity to save the list in a digital storage medium associated with the user's own computer (or other network appliance).

In step 96 of the embodiment of FIGS. 9-10 (corresponding to step 12 of the embodiment of Appendix B), the user is enabled to research and select the most desirable industry options from those provided in step 95.

In step 101 of the embodiment of FIGS. 9-10 (corresponding to step 13 of the embodiment of Appendix B, and Screen 44 of the embodiment of Appendix C), the user is given the option of sorting the system's output by various criteria.

In step 102 of the embodiment of FIGS. 9-10 (corresponding to steps 14-18 of the embodiment of Appendix B, and Screen 45 of the embodiment of Appendix C), the user is provided with information on specific enterprises, within the industries and job functions of interest, that represent logical search targets for finding appropriately experienced job candidates. In one embodiment, the system also provides the user with a direct link to a resume posting source (for example, to a website such as hotjobs.com, or a resume posting website for an educational institution). Such a link may be provided, for example, as an HTML link from a listed industry or enterprise. The link may be keyed directly to a relevant industry section or specific resume posting at the destination resume posting source. Such keying may be determined based on the system's listing of industries and enterprises, or the user's input concerning the position to be filled (such as the preference inputs).

In step 103 of the embodiment of FIGS. 9-10 (corresponding to step 19 of the embodiment of Appendix B), the user is given the option of having a dialogue with other companies who have hired from industries and job function areas outside their own.

In step 104 of the embodiment of FIGS. 9-10 (corresponding to steps 20-27 of the embodiment of Appendix B, and Screen 46 of the embodiment of Appendix C), the user is given the option of obtaining function-specific contacts within the selected industries or companies.

In step 105 of the embodiment of FIGS. 9-10 (corresponding to steps 28-33 of the embodiment of Appendix B, and Screens 47-48 of the embodiment of Appendix C), the user is given the option of purchasing additional information, such as contact information for recruiters in the selected industries and job function areas.

Finally, in step 106 of the embodiment of FIGS. 9-10 (corresponding to steps 34-36 of the embodiment of Appendix B, and Screens 49-50 of the embodiment of Appendix C), the user is enabled to provide post-process feedback, in a similar fashion to that of step 86 of the embodiment of FIGS. 7-8.

While the described embodiments of FIGS. 7-8 and 9-10 are tailored towards identifying businesses to or from which job function capabilities are potentially transferable, it should be recognized by those of ordinary skill in the art that embodiments of the invention are not limited to identifying business enterprises. Embodiments of the invention may also be used to identify potential transfers in governmental, military, academic, and other fields of endeavor.

In one embodiment according to the invention, analogous methods to those described herein for identifying industries based on employment background are used to identify industries based on educational background. For example, an employer can use such an embodiment to obtain a recommendation of a set of educational backgrounds (such as classes taken, major areas of study, or degrees or certifications obtained) from which the employer may find a population of potential employees. In such a case, a data structure may correlate the employer's industry with a set of educational backgrounds, for a job function of interest to the employer. The employer may also be provided with a list of educational institutions that provide such educational backgrounds. Alternatively, such an embodiment may be used by a job seeker to obtain a set of recommended industries for the job seeker's job search, by consulting a data structure correlating educational background with a set of industries.

It should also be noted that, while the described embodiments of FIGS. 7-8 and 9-10 identify industries and enterprises to or from which job function capabilities are potentially transferable (based on similarity of skill sets and variables across industries), they need not necessarily also identify enterprises in which specific job opportunities are actually known to be available.

In addition, while the description of the embodiments of FIGS. 7-8 and 9-10 mention instances where the user is asked for payment (or payment information), it will be appreciated by those of ordinary skill in the art that differing schemes for payment are also possible in accordance with embodiments of the invention. For example, users may be enabled to use the system for free, for a single initial fee, or by paying at various stages throughout the process.

In a further embodiment according to the invention, identification of industries and enterprises for potential transfer is facilitated through the use of preference analysis techniques, such as collaborative filtering. In this embodiment, the initial steps of the embodiments of FIGS. 7-8 and 9-10 are the same, but the post-process feedback is modified to provide preference analysis data. The system distributes a ratings questionnaire or other preference questionnaire to each system user as part of the post-process feedback. The preference questionnaire elicits the user's degree of preference for a decision that they made as a result of the system's transferability recommendation. For example, it may seek a job seeker's rating of a job they took on a numerical scale of 1-10, or an employer's 1-10 rating of an employee they hired, based on transferability recommendations that the system provided. The system then receives each user's response to the preference questionnaire, along with other post-process feedback. The preference questionnaire may be implemented, in one embodiment, as an e-mail message, e-mail attachment, and/or HTML link. In this embodiment, the preference feedback can then be received by a computer, such as a web server, as an e-mailed (or otherwise digitally transmitted) reply to the preference questionnaire.

Once the preference feedback has been received, this preference-analysis embodiment next comprises the step of analyzing the users' preference feedback using preference analysis techniques, such as collaborative filtering. Collaborative filtering techniques are disclosed in U.S. Pat. No. 6,064,980 of Jacobi et al, and U.S. Pat. No. 6,041,311 of Chislenko et al., the disclosures of which are hereby incorporated herein by reference.

In one embodiment, a preference matrix is maintained. The rows and columns of the matrix correspond with the industries in a transferability data structure similar to the data structures illustrated in FIGS. 1, 2A-2B, and 11A-11B (below). At the intersection of each row and column, the matrix contains an average preference rating, representing the average preference rating received from a user who actually acted on the system's transferability recommendation. (Preference data from users should in this case include not just a rating, but also an account of the industry to and from which the transfer occurred). Different preference matrices may be maintained for job seekers and employers, or a single matrix could incorporate the feedback of both, in alternative embodiments. Once sufficient preference feedback has been collected to produce statistically meaningful results, the preference matrix is next compared with the present version of the transferability data structure upon which the system is basing recommendations. If there is a wide discrepancy between corresponding elements of the preference matrix and the transferability data structure, the latter may be modified in accordance with the former. In this fashion, the system's subsequent recommendations will be tailored to reflect the perceptions, as to its accuracy, of those who have acted on its recommendations in the past. Whether there is a "wide discrepancy" may be determined, for example, by quantifying the transferability data structure, in a fashion similar to that of FIGS. 2A and 2B (and on a numerical scale that is normalized to the ratings scale) and measuring a percentage difference between the average ratings in the preference matrix and the corresponding elements of the quantified data structure. Those elements having a percentage difference that exceeds a certain threshold may then be treated as needing to be updated. It should be noted that embodiments of the invention are not limited to performing a preference analysis in the particular fashion just described, but may also perform methods involving collaborative filtering, or other forms of preference analysis.

Next, further preference feedback may be gained from users of the modified transferability data structure. The post-process preference analysis steps are thus repeated, refining data on users' transferability preferences, and thereby refining future transferability recommendations.

FIGS. 11A and 11B are diagrammatic representations of industry transferability data structures in accordance with an embodiment of the invention that uses a symbolic representation of industry transfers. In the embodiments of FIGS. 11A and 11B, analogous data structures to those of FIGS. 1, 2A and 2B are illustrated, for Marketing Management and Operations Management, respectively. However, the embodiments of FIGS. 11A and 11B represent each possible cross-industry transfer of a job function capability using a symbolic representation. Each job function is represented using a job function symbol; for example, the marketing management job function is represented using "M" in FIG. 11A, while the operations management job function is represented using "O" in FIG. 11B. Each industry is represented using an industry symbol; for example, the numbers 1 to 17 in FIGS. 11A and 11B. A transfer from a job function in one industry to a job function in a second industry is represented using a transfer operator; for example, the "+" symbol in FIGS. 11A and 11B.

FIGS. 11A and 11B illustrate use of this symbolic representation: for example, in FIG. 11A, a transfer from the marketing management job function (M) in the consumer software industry (5) to the marketing management job function (M) in the consumer durables industry (2) is represented as M5+M2 in the appropriate row and column. Similarly, in FIG. 11B, one operations management job function transfer is represented as O1+O2. Analogous data structures to those represented in FIGS. 11A and 11B may be formed for other job functions.

In accordance with the embodiment of FIGS. 11A and 11B, a symbolic representation of each transfer is associated with a transferability rating in an industry transferability database; and may also be associated with text of a corresponding explanation of degree of transferability. The symbolic representation may thus be used as a language for instructing an automated system to retrieve the transferability rating, and the text of its corresponding explanation. The association of the symbolic representation with the rating, and explanation text, may be made, for example, by a pointer; or using object-oriented programming techniques; as will be appreciated by those of ordinary skill in the art. As an example of using a symbolic representation language, input of the symbols M5+M2 may generate the rating "1" (as in FIG. 2A), and text of a corresponding explanation, analogous to that of Screen 17 of Appendix C. In one embodiment, a user of an automated system uses such a symbolic representation as an input language for a query to the database. In another embodiment, the user need not type in such symbols; instead they are generated automatically by a data processor based on user input, and then are used by the processor as inputs for a query to the database. For example, upon receipt of a user's job function and industry input (or other transferability query), the correct symbolic representation may be generated automatically and used as a request to a database system for retrieval of a set of output industries (and other associated outputs such as transferability ratings and explanation texts).

The same symbolic representation of the embodiments of FIGS. 11A and 11B may also be used to categorize symbolically a subject of a user's transferability query. Thus, a subject job seeker with experience in a given job function and industry is represented using the appropriate symbols; for example, M1 can be used to represent a job seeker with marketing management experience in the consumer package goods industry. Similarly, a subject that is the target population of an employer's search for job candidates is also represented using the appropriate symbols; for example, M5 can be used to represent the target population of an employer's search for a marketing manager in the consumer software industry. A subject with experience in more than one job function or industry may be represented using a comma between symbols; thus {M2, M3} represents a marketing manager with experience in both the consumer durables and entertainment products industries.

Subjects may also be characterized using symbols representing other system inputs, including (for example) educational backgrounds, geographical locations, company sizes, hierarchical positions, and preferences. Thus, for example, the symbolic representation {M1, M5, MBA, MSME, CT, F500, CMO, P-CT, P-PV, P-TECH} could be used to represent a marketing manager with experience in the consumer package goods and consumer software industries, who has an MBA and an MSME degree, who has worked in Connecticut at a Fortune 500 company, and risen to the Chief Marketing Officer hierarchical level; and who has preferences for jobs in Connecticut, at private companies, in the technology sector.

In accordance with the embodiment of FIGS. 11A and 11B, such a symbolic representation of the subject of a user's transferability query may be used to cause retrieval of a set of second industries and their associated transferability ratings, and transferability explanations. Thus, for example, representation of a subject as an M1 may cause the retrieval of the row of transferability ratings illustrated in FIG. 2C, and of the associated transferability explanations. If a subject is represented using symbols that stand for experience in more than one industry (for example, {M2, M3}), then ratings corresponding to all of the transferable industries may be retrieved and aggregated. Thus, for example, two rows like that of FIG. 2C may be retrieved, to reflect the greater number of industry options available to a job seeker with dual industry experience. In one embodiment, a user of an automated system uses the symbolic representation as an input language for a query to the database. In another embodiment, the user need not type in such symbols; instead they are generated automatically based on user input, and then automatically used as inputs to a query to the database for retrieval of a row of the transferability matrix. The association of the symbolic representation of a subject with a set of industries, transferability ratings, and explanations may be formed, for example, by using pointers, or using object-oriented programming techniques, as will be appreciated by those of ordinary skill in the art.

While the above has described features of some embodiments according to the invention that may be implemented using the World Wide Web, it should be recognized that these features may equally be implemented on a communications network (for example, the Internet) without being implemented on the Web. Also, such features may equally be implemented using wireless devices, or other network appliances. It should also be appreciated that, according to an embodiment of the invention, a database need not be centrally located, but may instead be associated with a communications network in ways that will be apparent to those of skill in the art. Additionally, it should be recognized that where features are described as being implemented using the HTML language, they may also be implemented by other languages, as will be recognized by those of ordinary skill in the art. For example, embodiments may be implemented using XML.

Although this description has set forth the invention with reference to several preferred embodiments, one of ordinary skill in the art will understand that one may make various modifications without departing from the spirit and the scope of the invention, as set forth in the claims.

What is claimed is:

1. A computerized apparatus for identifying industries for potential transfer of a job function with respect to a first industry, the apparatus comprising:
 a server coupled to a communications network; and
 a digital storage medium coupled to the server, wherein the server is configured to run processes including:
 a. in a first digital computer process, receiving over the communications network data identifying the job function in the first industry;
 b. in a second digital computer process, accessing a database, stored on the digital storage medium, containing information, developed for the job function, listing industries to which and from which the job function is potentially transferable, the information corresponding to markings in a square matrix, the matrix having a pair of orthogonal axes, and a series of positions along each axis, with each position along each axis being associated with a different industry in which the job function is performed, wherein each industry occupies a corresponding position along each axis, so that
 (1) in a row of the matrix corresponding to a selected industry in which an individual has experience are markings of columns of industries to which the experience of the individual is potentially transferable and
 (2) in a column of the matrix corresponding to a selected industry in which a company may be seeking candidates are markings of rows of industries from which a candidate's experience therein may be transferable to the selected industry;
 wherein the pattern of markings in the matrix is not symmetric; and
 c. in a third digital computer process, using the database to identify at least one industry other than the first industry for potential transfer of the job function.

2. Apparatus according to claim 1, wherein the server is a web server on the World Wide Web, and wherein the server provides a web page for receiving, from a user device, the data identifying the job function in the first industry.

3. Apparatus according to claim 1, wherein using the database to identify at least one industry other than the first industry for potential transfer of the job function comprises at least one of:
 identifying an industry into which a job function capability of a subject is potentially transferable, out of the first industry; and
 identifying an industry out of which a job function capability is potentially transferable, into the first industry.

4. Apparatus according to claim 3, wherein the database quantifies degree of transferability between the first industry and each of the identified industries.

5. Apparatus according to claim 3, further comprising, in a fourth digital computer process, providing over the communications network information relating to at least one of:
 the first industry;
 at least one of the identified industries;
 a transferability rating for a transfer out of the first industry, into an industry of the set of identified industries;
 a transferability rating for a transfer into the first industry, out of an industry in the set of identified industries;
 an explanation of degree of transferability out of the first industry, into an industry of the set of identified industries;
 an explanation of degree of transferability into the first industry, out of an industry of the set of identified industries;
 an enterprise within at least one of the industries;
 a job posting source;
 a resume posting source;
 a recruiter specializing in the first industry;
 a recruiter specializing in one of the identified industries; and
 a recruiter specializing in the job function.

6. Apparatus according to claim 5, where in the information provided over the communications network is limited by at least one of:
 preferences associated with a user;
 a desired skill set associated with a user; and
 the size of a company with which a user has experience.

7. Apparatus according to claim 1, wherein the database is accessed using at least one of:
 a symbolic representation of a job transfer between the first industry and a second industry, of a set of second industries with respect to which the job function capability is potentially transferable; and
 a symbolic representation that categorizes a subject of a user's job transferability query.

8. Apparatus according to claim 1, further comprising:
 in a fifth digital computer process, updating the database's correlation of industries based upon feedback information provided over the communications network by users who have used industry correlation information from the database.

9. Apparatus comprising at least one non-transitory computer readable medium encoded with instructions which, when loaded into a computer, establish processes for identifying industries for potential transfer of a job function with respect to a first industry, the processes comprising:
   a. in a first digital computer process, receiving data identifying the job function in the first industry;
   b. in a second digital computer process, accessing a database, stored on a digital storage medium, containing information, developed for the job function, listing industries to which and from which the job function is potentially transferable, the information corresponding to markings in a square matrix, the matrix having a pair of orthogonal axes, and a series of positions along each axis, with each position along each axis being associated with a different industry in which the job function is performed, wherein each industry occupies a corresponding position along each axis, so that
      (1) in a row of the matrix corresponding to a selected industry in which an individual has experience are markings of columns of industries to which the experience of the individual is potentially transferable and
      (2) in a column of the matrix corresponding to a selected industry in which a company may be seeking candidates are markings of rows of industries from which a candidate's experience therein may be transferable to the selected industry;
      wherein the pattern of markings in the matrix is not symmetric; and
   c. in a third digital computer process, using the database to identify at least one industry other than the first industry for potential transfer of the job function.

10. Apparatus according to claim 9, wherein the computer is a web server on the World Wide Web that provides a web page for receiving, from a user device, the data identifying the job function in the first industry.

11. Apparatus according to claim 9, wherein using the database to identify at least one industry other than the first industry for potential transfer of the job function comprises at least one of:
   identifying an industry into which a job function capability of a subject is potentially transferable, out of the first industry; and
   identifying an industry out of which a job function capability is potentially transferable, into the first industry.

12. Apparatus according to claim 11, wherein the database quantifies degree of transferability between the first industry and each of the identified industries.

13. Apparatus according to claim 11, further comprising, in a fourth digital computer process, providing over the communications network information relating to at least one of:
   the first industry;
   at least one of the identified industries;
   a transferability rating for a transfer out of the first industry, into an industry of the set of identified industries;
   a transferability rating for a transfer into the first industry, out of an industry in the set of identified industries;
   an explanation of degree of transferability out of the first industry, into an industry of the set of identified industries;
   an explanation of degree of transferability into the first industry, out of an industry of the set of identified industries;
   an enterprise within at least one of the industries;
   a job posting source;
   a resume posting source;
   a recruiter specializing in the first industry;
   a recruiter specializing in one of the identified industries; and
   a recruiter specializing in the job function.

14. Apparatus according to claim 13, where in the information provided over the communications network is limited by at least one of:
   preferences associated with a user;
   a desired skill set associated with a user; and
   the size of a company with which a user has experience.

15. Apparatus according to claim 9, wherein the database is accessed using at least one of:
   a symbolic representation of a job transfer between the first industry and a second industry, of a set of second industries with respect to which the job function capability is potentially transferable; and
   a symbolic representation that categorizes a subject of a user's job transferability query.

16. Apparatus according to claim 9, further comprising:
   in a fifth digital computer process, updating the database's correlation of industries based upon feedback information provided over the communications network by users who have used industry correlation information from the database.

* * * * *